US012378072B2

(12) United States Patent
Mohanarajah et al.

(10) Patent No.: US 12,378,072 B2
(45) Date of Patent: Aug. 5, 2025

(54) TRANSPORTATION ROBOT CONTROL SYSTEM FOR WAREHOUSE SYSTEM AND CONTROL METHOD

(71) Applicant: Rapyuta Robotics Co., Ltd., Tokyo (JP)

(72) Inventors: Gajamohan Mohanarajah, Tokyo (JP); Arudchelvan Krishnamoorthy, Tokyo (JP); Toshiaki Yamada, Tokyo (JP); Bhuvan Chandra Dharanikota Venkata, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 295 days.

(21) Appl. No.: 18/165,458

(22) Filed: Feb. 7, 2023

(65) Prior Publication Data
US 2023/0278232 A1    Sep. 7, 2023

Related U.S. Application Data

(60) Provisional application No. 63/315,563, filed on Mar. 2, 2022, provisional application No. 63/482,805, filed on Feb. 2, 2023.

(51) Int. Cl.
| | |
|---|---|
| *B65G 1/04* | (2006.01) |
| *B25J 9/16* | (2006.01) |

(Continued)

(52) U.S. Cl.
CPC ............ *B65G 1/0492* (2013.01); *B25J 9/161* (2013.01); *B25J 9/1676* (2013.01); *B25J 13/006* (2013.01);

(Continued)

(58) Field of Classification Search
CPC . B25J 5/007; B25J 9/161; B25J 9/1676; B25J 13/006; B65G 1/0471;

(Continued)

(56) References Cited

U.S. PATENT DOCUMENTS

| | | | |
|---|---|---|---|
| 6,377,888 B1 * | 4/2002 | Olch | G05D 1/0261 701/25 |
| 2016/0009493 A1 | 1/2016 | Stevens et al. | |

(Continued)

FOREIGN PATENT DOCUMENTS

| | | |
|---|---|---|
| JP | 06-024506 A | 2/1994 |
| JP | 2017-522247 A | 8/2017 |

(Continued)

OTHER PUBLICATIONS

International Search Report and Written Opinion mailed on Apr. 4, 2023 in the PCT Application No. PCT/JP2023/006764.

*Primary Examiner* — Dale Moyer
(74) *Attorney, Agent, or Firm* — Trupti P. Joshi

(57) ABSTRACT

An object is to provide a transportation robot control system for a warehouse system and a control method that can stably control a large number of robots by wireless communication. A transportation robot control system 3 controls transportation robots 30 in a warehouse system 1. The transportation robot control system 3 includes: a central wireless communication unit 200 configured to be able to wirelessly communicate with the transportation robots 30 in a specific region of the warehouse system 1; an individual wireless communication unit 210 configured to be able to wirelessly communicate with the transportation robots 30; and individual control units 220 that respectively control the movements of the transportation robots 30. The individual wireless communication unit 210 includes information reading units 211 that are respectively provided in the transportation robots 30 and a plurality of information holding units 212

(Continued)

that are arranged in a rack 2. Each of the information holding units 212 holds position information indicating a position in the rack 2, at the position, the information holding unit 212 is arranged.

20 Claims, 12 Drawing Sheets

(51) Int. Cl.
    *B25J 13/00*     (2006.01)
    *B65G 1/06*     (2006.01)
    *B65G 1/10*     (2006.01)
    *B65G 1/127*     (2006.01)
    *B65G 1/137*     (2006.01)
    *B25J 5/00*     (2006.01)

(52) U.S. Cl.
    CPC ......... *B65G 1/0471* (2013.01); *B65G 1/0478* (2013.01); *B65G 1/06* (2013.01); *B65G 1/065* (2013.01); *B65G 1/10* (2013.01); *B65G 1/127* (2013.01); *B65G 1/1371* (2013.01); *B65G 1/1373* (2013.01); *B25J 5/007* (2013.01); *B65G 2201/0235* (2013.01); *B65G 2201/0258* (2013.01); *B65G 2203/0233* (2013.01); *B65G 2203/0283* (2013.01); *B65G 2811/0678* (2013.01)

(58) Field of Classification Search
    CPC ........ B65G 1/0492; B65G 1/06; B65G 1/065; B65G 1/10; B65G 1/127; B65G 1/1371; B65G 2201/0235; B65G 2201/0258; B65G 2201/0233; B65G 2201/0283; B65G 2811/0678
    See application file for complete search history.

(56) References Cited

U.S. PATENT DOCUMENTS

| | | |
|---|---|---|
| 2017/0267452 A1 | 9/2017 | Goren et al. |
| 2021/0149416 A1* | 5/2021 | Srivastava ............ B66F 9/063 |
| 2021/0221615 A1 | 7/2021 | Buchmann |
| 2021/0223783 A1* | 7/2021 | M .................. B60W 60/00256 |
| 2022/0106122 A1 | 4/2022 | Tie |
| 2023/0141591 A1* | 5/2023 | Howarth ................ G06Q 10/08 |
| | | 700/218 |

FOREIGN PATENT DOCUMENTS

| | | |
|---|---|---|
| JP | 2018-516824 A | 6/2018 |
| WO | WO 2021/122218 A1 | 6/2021 |
| WO | WO 2021/218931 A1 | 11/2021 |

* cited by examiner

TRANSPORTATION ROBOT CONTROL SYSTEM FOR WAREHOUSE SYSTEM AND CONTROL METHOD

CROSS-REFERENCE TO RELATED APPLICATIONS

The present application claims the benefit of priority to U.S. Provisional Application No. 63/315,563 filed on Mar. 2, 2022, and U.S. Provisional Application No. 63/482,805 filed on Feb. 2, 2023, the contents of each of which are hereby incorporated by reference in their entirety.

TECHNICAL FIELD

The present disclosure generally relates to a transportation robot control system for a warehouse system and a control method, and more particularly relates to a transportation robot control system for a warehouse system such as an Automated Storage and Retrieval System (an ASRS or an AS/RS) and a control method.

BACKGROUND

As Electronic Commerce (EC) markets expand, improvement of item storage efficiency and item picking work efficiency for logistics has become a great problem. In order to resolve this problem, for example, WO2018/189110 A1 discloses a warehouse. This warehouse is partitioned into a storage area 10 and an order preparation area 11. A rack 100 storing trays 102 for containing storage target products is arranged in the storage area 10. On the other hand, order preparation stations 12 for operators 13 to process orders are arranged in the order preparation area 11.

To process an order, an automated device 103 which is a transportation robot transports the tray 102 containing an order target product from the rack 100 to the order preparation station 12. The automated device 103 is controlled by a central control device. For example, the automated device 103 receives position information from the central control device by wireless communication, and thus the transportation of the tray 102 containing the order target product is controlled. In the warehouse, a large number of automated devices 103 are used, and the large number of automated devices 103 each are controlled by wireless information from the central control device. The automated device 103 needs to be controlled to avoid a collision with the other automated devices 103. Hence, when a large number of automated devices 103 are used, the amount of communication is very high, with the result that the control may be unstable. Depending on the position of the rack 100, there are cased in which the automated device 103 cannot receive the wireless information. As described above, in a conventional warehouse, there are cases in which a large number of automated devices 103 cannot be stably controlled by wireless communication.

The present disclosure has been made in light of the above problem, and an object of the present disclosure is to provide a transportation robot control system for a warehouse system and a control method which can stably control a large number of robots by wireless communication.

SUMMARY

In order to achieve the above object, a transportation robot control system for a warehouse system according to the present disclosure is a transportation robot control system for a warehouse system that stores items in a rack and includes a plurality of transportation robots for transporting the items stored, and includes: a central wireless communication unit configured to be able to wirelessly communicate with the transportation robots in a specific region of the warehouse system; an individual wireless communication unit configured to be able to wirelessly communicate with the transportation robots; and individual control units respectively controlling the movements of the transportation robots. The individual wireless communication unit includes information reading units that are respectively provided in the transportation robots and a plurality of information holding units that are arranged in the rack. Each of the information holding units holds position information indicating a position in the rack. At the position, the information holding unit is arranged. Each of the information reading units is configured to be able to read position information held by the information holding units.

In the transportation robot control system for a warehouse system according to the one aspect of the present disclosure, each of the individual control units controls, based on the position information read from the information holding unit by the information reading unit of the transportation robot, the transportation robot being the object of the control by the individual control unit, the movement of the transportation robot being the object.

The transportation robot control system for a warehouse system according to the one aspect of the present disclosure further includes: a central control unit which is a control unit for controlling the movements of the transportation robots, the central control unit generates individual route information indicating a movement route of each of the transportation robots, the central wireless communication unit transmits the individual route information to the transportation robot for which the individual route information is generated and the individual control unit for the transportation robot controls, based on the position information read from the information reading unit, the transportation robot such that the transportation robot moves along the movement route indicated by the route information.

In the transportation robot control system for a warehouse system according to the one aspect of the present disclosure, each of the information reading units is configured to be able to read, in a predetermined range around each of the information holding units, the information held by the information holding unit, and the predetermined ranges of the information holding units do not overlap each other.

In the transportation robot control system for a warehouse system according to the one aspect of the present disclosure, the information holding units are uniformly distributed on each floor in the rack.

The transportation robot control system for a warehouse system according to the one aspect of the present disclosure further includes: mutual wireless communication units allowing each of the transportation robots to wirelessly communicate with the other transportation robots, and each of the individual control units controls, based on the content of wireless communication performed by the mutual wireless communication unit of the transportation robot being the object of the individual control unit, the movement of the corresponding transportation robot.

In the transportation robot control system for a warehouse system according to the one aspect of the present disclosure, each of the individual control units determines, based on the movement route information for the transportation robot being the object of the individual control unit, the position information read from the information holding unit for the transportation robot being the object and the content of the wireless communication performed by the mutual wireless communication unit, a collision between the corresponding transportation robot and another of the transportation robots.

In the transportation robot control system for a warehouse system according to the one aspect of the present disclosure, when each of the individual control units determines that the transportation robot being the object collides with the another of the transportation robots, the individual control unit stops the transportation robot being the object.

In the transportation robot control system for a warehouse system according to the one aspect of the present disclosure, the mutual wireless communication unit of one of the transportation robots exchanges, with the mutual wireless communication units of another of the transportation robots, by wireless communication, the position information and the route information thereof.

In order to achieve the above object, a method for controlling a transportation robot in a warehouse system according to the present disclosure is a method for controlling a transportation robot in a warehouse system that stores items in a rack and includes a plurality of transportation robots for transporting the items stored, and includes: a central wireless communication step of wirelessly communicating with the transportation robots in a specific region of the warehouse system; an individual wireless communication step of wirelessly communicating with the transportation robots; and individual control steps of respectively controlling movements of the transportation robots. The individual wireless communication step includes information reading steps that are respectively performed in the transportation robots and a plurality of information holding steps that are respectively performed in a plurality of positions in the rack. The information holding steps are to hold position information indicating positions in the rack. Each of the information reading steps is to read position information held by the information holding steps.

In the method for controlling a transportation robot in a warehouse system according to the one aspect of the present disclosure, each of the individual control steps controls, based on the position information which is read in the information reading step performed by the transportation robot, the robot being the object of the control by the individual control step and is held in the information holding step, the movement of the transportation robot being the object.

The method for controlling a transportation robot in a warehouse system according to the one aspect of the present disclosure further includes: a central control step of controlling the movements of the transportation robots, the central control step generates individual route information indicating a movement route of each of the transportation robots, the central wireless communication step transmits the individual route information to the transportation robot for which the individual route information is generated and the individual control step for the transportation robot controls, based on the position information read in the information reading step, the transportation robot such that the transportation robot moves along the movement route indicated by the route information.

In the method for controlling a transportation robot in a warehouse system according to the one aspect of the present disclosure, each of the information reading steps is configured to be able to read, in a predetermined range around the position indicated by the position information held in the information holding step, the information held in the information holding step, and the predetermined ranges do not overlap each other.

In the method for controlling a transportation robot in a warehouse system according to the one aspect of the present disclosure, the positions indicated by the position information held in the information holding steps are uniformly distributed on each floor in the rack.

The method for controlling a transportation robot in a warehouse system according to the one aspect of the present disclosure further includes: mutual wireless communication steps of performing wireless communication between each of the transportation robots and the other transportation robots, and each of the individual control steps controls, based on content of the mutual wireless communication step of the transportation robot being the object of the individual control step, the movement of the corresponding transportation robot.

In the method for controlling a transportation robot in a warehouse system according to the one aspect of the present disclosure, each of the individual control steps determines, based on the movement route information for the transportation robot being the object of the individual control step, the position information read in the information holding step for the transportation robot being the object and the content of the mutual wireless communication step, a collision between the corresponding transportation robot and another of the transportation robots.

In the method for controlling a transportation robot in a warehouse system according to the one aspect of the present disclosure, when each of the individual control steps determines that the transportation robot being the object collides with the another of the transportation robots, the individual control step stops the transportation robot being the object.

In the method for controlling a transportation robot in a warehouse system according to the one aspect of the present disclosure, the mutual wireless communication step of one of the transportation robots exchanges, with the mutual wireless communication steps of another of the transportation robots, by wireless communication, the position information and the route information thereof.

In order to achieve the above object, in a non-transitory computer-readable medium including a processor instruction according to the present disclosure, when the processor instruction is executed by one or more processors, the one or more processors are caused to perform, in a warehouse system that stores items in a rack and includes a plurality of transportation robots for transporting the items stored, a central wireless communication step of wirelessly communicating with the transportation robots in a specific region of the warehouse system, an individual wireless communication step of wirelessly communicating with the transportation robots and individual control steps of respectively controlling movements of the transportation robots. The individual wireless communication step includes information reading steps that are respectively performed in the transportation robots and a plurality of information holding steps that are respectively performed in a plurality of positions in the rack. Each of the information holding steps is to hold position information indicating a position of the information holding step in the rack. Each of the information reading steps is to read position information held by the information holding steps.

DESCRIPTION OF EMBODIMENTS

Figure 1:
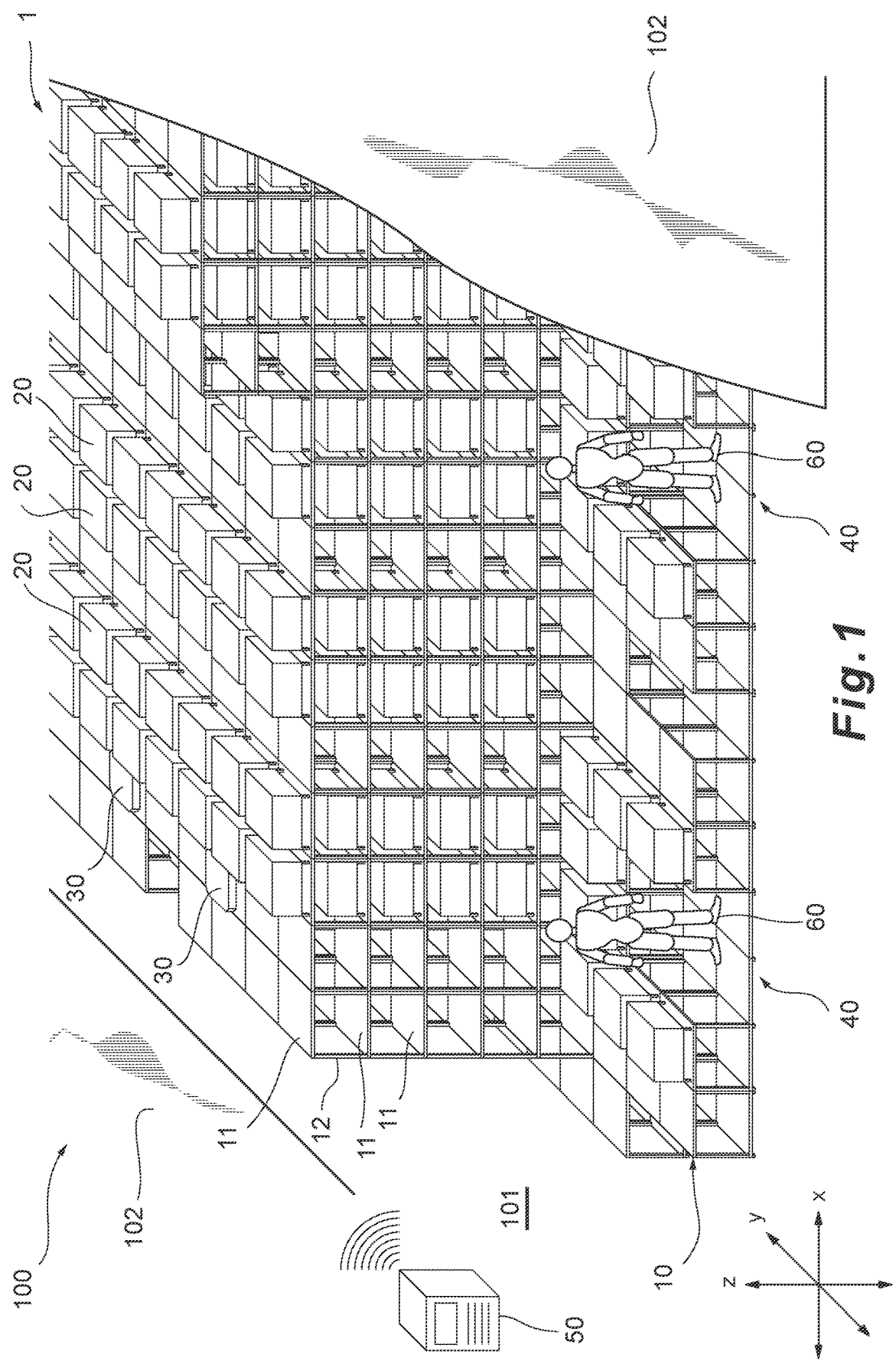
FIG. 1 is a perspective view schematically illustrating an external appearance of an example of a warehouse system to which a transportation robot control system for a warehouse system according to an embodiment of the present disclosure is applied.

Hereinafter, an embodiment of the present disclosure will be described with reference to the accompanying drawings. In all drawings, identical reference numerals are used to refer to identical or similar constituent elements. The following embodiment does not intend to limit the disclosure recited in the claims. Examples and features of the disclosed principal will be described in the present specification, yet can be changed and modified without departing from the idea and the scope of the disclosed embodiment. Furthermore, specific features, structures or characteristics can be combined by an arbitrary appropriate method in one or more embodiments. The following detailed description is taken into account only as exemplary description, and the true range and idea are intended to be indicated by the claims.

FIG. 1 is a perspective view schematically illustrating an external appearance of a warehouse system 1 to which a transportation robot control system for a warehouse system 3 according to an embodiment of the present disclosure is applied. The warehouse system 1 is constructed in, for example, a building 100. The building 100 includes a floor surface 101 extending along a horizontal plane, a plurality of sidewalls 102 vertically standing from the floor surface 101 and a ceiling (not illustrated) supported by the sidewalls 102. For example, the four sidewalls 102 surrounding four sides and the ceiling extending in parallel to the floor surface 101 establish an internal space with the floor surface 101. The warehouse system 1 is constructed in this internal space. Note that part of the sidewalls 102 are cut out for ease of description in FIG. 1. In the building 100, an x axis and a y axis extending in directions perpendicular to each other on the horizontal plane and a z axis extending in a vertical direction and perpendicular to the x axis and the y axis are defined.

The warehouse system 1 is a warehouse system which can automate a series of work from the warehousing to the storage and delivery of items including products and the like based on centralized management. The warehouse system 1 in the present example includes a rack 10 arranged on the floor surface 101, a plurality of storage bins 20 which are containers stored in the rack 10, a plurality of transportation robots 30 for transporting the storage bins 20, one or more picking stations 40 for picking items including products and the like contained in the storage bins 20 and a management server 50 for managing the series of work in the warehouse system 1. At the picking station 40, a human operator 60 performs picking work for picking an item from the storage bin 20.

The rack 10 includes a plurality of floors 11, each of floors 11 defining a surface which extends in parallel to each other along each xy plane, and a plurality of support columns 12 supporting the plurality of floors 11. In the present example, the floors 11 of a first floor to a ninth floor vertically standing in an x axis direction from the floor surface 101 are formed. A total height of the rack 10 from the floor surface 101 in the x axis direction can be set according to a height in the z axis direction of the ceiling of the building 100. Note that part of the floors 11 of the eighth floor and the ninth floor is omitted in FIG. 1 for explanatory convenience, and configurations of the floors 11 of the eighth floor and the ninth floor are configured similar to the floor 11 of the seventh floor.

Figure 2:
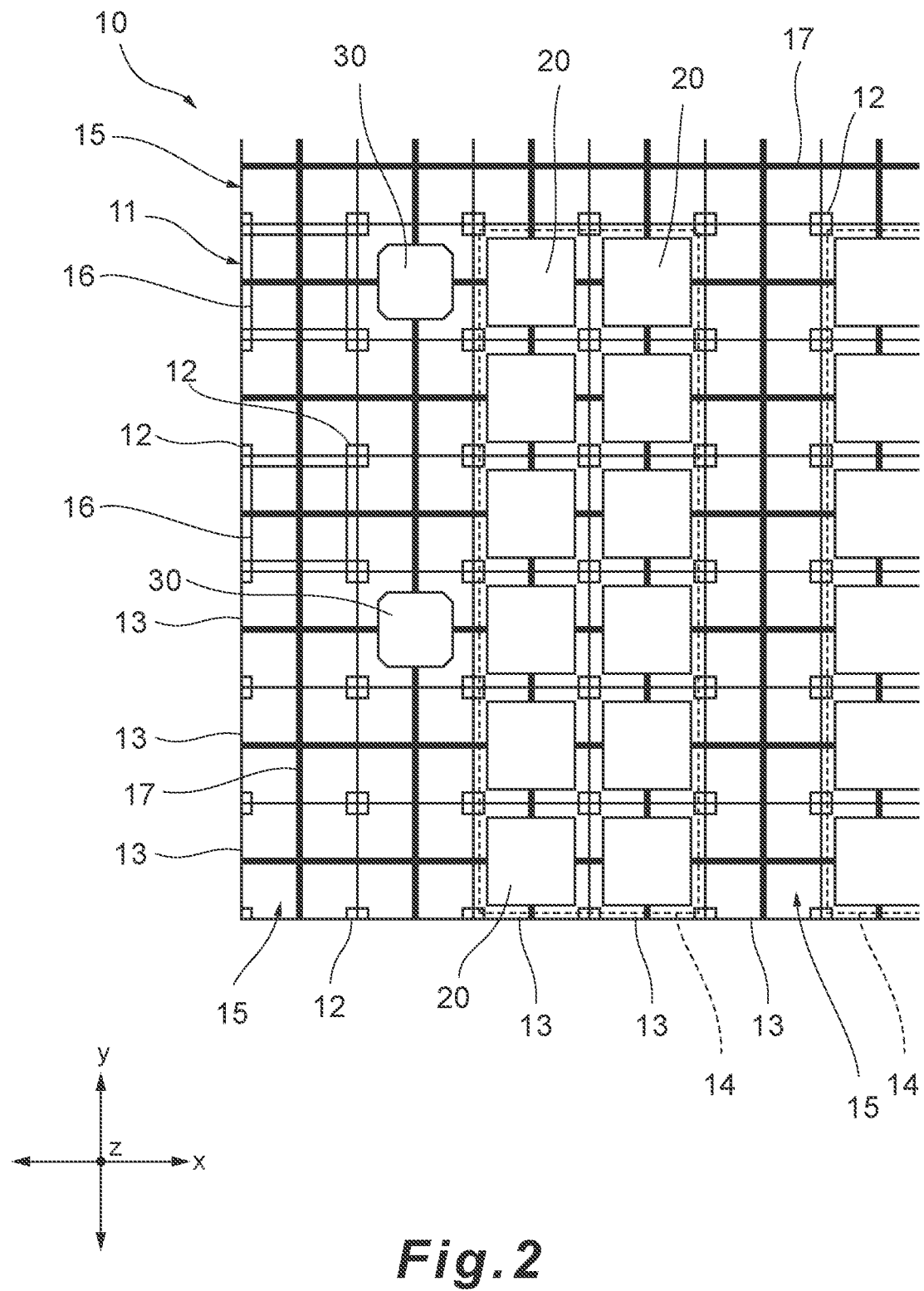
FIG. 2 is a top view schematically illustrating an example of the structure of a floor of a rack in the warehouse system illustrated in FIG. 1.

FIG. 2 is a top view schematically illustrating an example of a structure of the floor 11 of the rack 10 in the warehouse system 1 in the present example. In the present example, each floor 11 of the rack 10 defines a plurality of sections 13 which are aligned along the xy plane. The section 13 defines, for example, outlines of a square or a rectangle in plan view. In the present example, the support columns 12 are respectively arranged at the four corners of one section 13. The one storage bin 20 occupies one section 13. Similarly, the one transportation robot 30 occupies the one section 13. That is, an outline of the storage bin 20 and an outline of the transportation robot 30 are respectively arranged in the outline of the one section 13 in plan view. Furthermore, an interval between a pair of the mutually neighboring support columns 12 is set larger than widths of the transportation robot 30 and the storage bin 20 defined in the x axis direction and a y axis direction.

Each floor 11 defines storage areas 14 including the sections 13 in which the storage bins 20 are aligned, and movement passages 15 of the transportation robots 30 including the sections 13 other than the storage areas 14. In the illustrated example, for example, two rows of bin groups of the plurality of storage bins 20 aligned along the y axis direction are aligned in the x axis direction in the storage area 14. That is, all of the storage bins 20 making up the bin group of these two rows of the storage bins 20 face the movement passages 15 at all times. On the other hand, the transportation robots 30 can run on the movement passages 14. As described later, the transportation robot 30 can also run in the storage area 14 through a space below the bottom surface of the storage bin 20.

Figure 3:
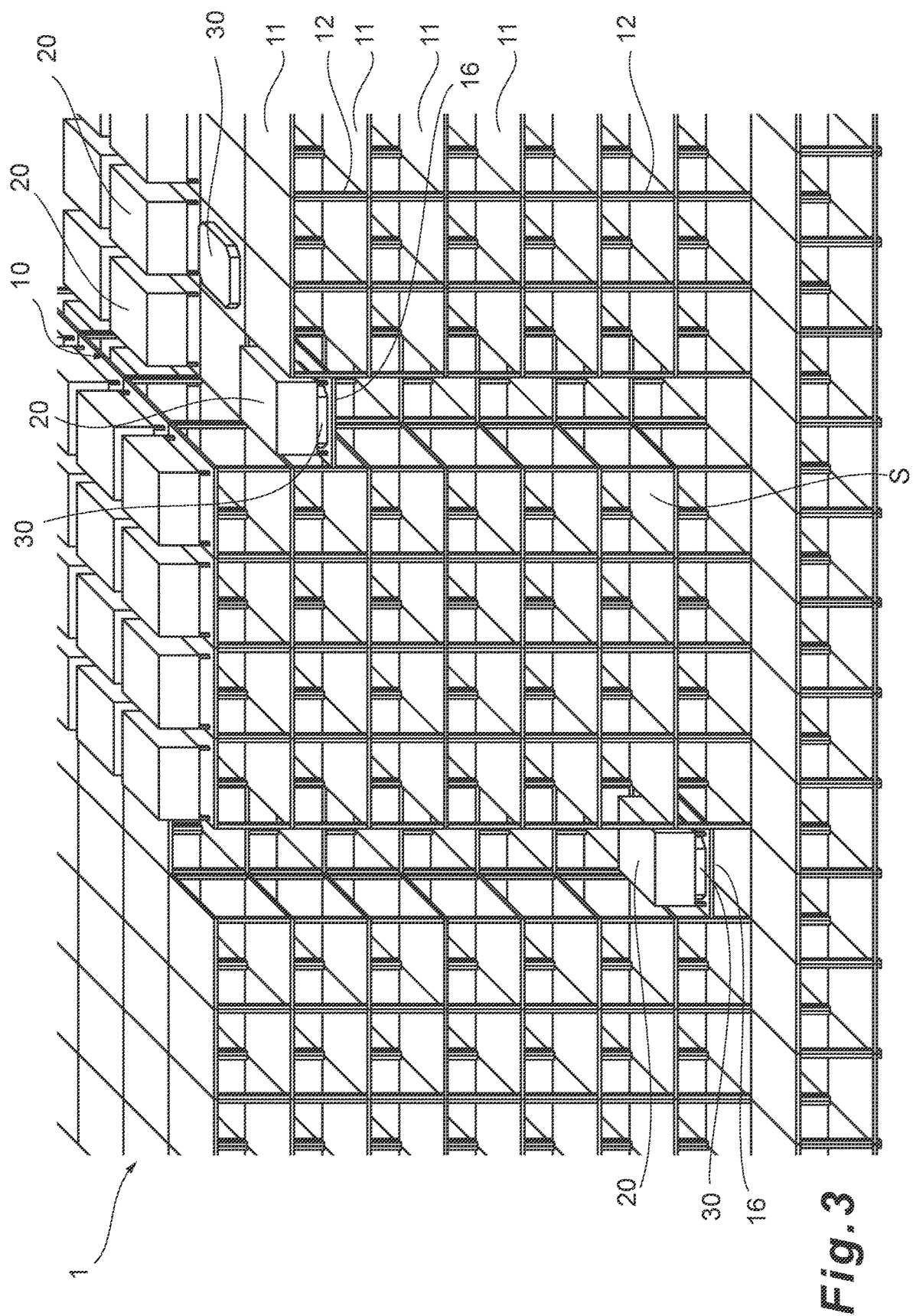
FIG. 3 is a perspective view schematically illustrating an example of the structure of the rack in the warehouse system illustrated in FIG. 1.

FIG. 3 is a perspective view schematically illustrating an example of a structure of the rack 10 in the warehouse system 1 in the present example. Referring to FIGS. 1 to 3 together, the rack 10 includes one or more transportation elevators 16. The transportation elevators 16 can make reciprocating movement in the z axis direction from the first floor to the ninth floor of the floors 11, and stop each floor 11. Each transportation elevator 16 is arranged in one section in the movement passage 15 of the transportation robot 30 on each floor 11. In the present embodiment, the plurality of transportation elevators 16 may be provided to the rack 10. The transportation elevator 16 can have only the transportation robot 30 get thereon or have the transportation robot 30 holding the storage bin 20 get thereon to move to each floor of the first floor to the ninth floor.

The transportation elevator 16 includes, for example, shafts of four corners attached to the rack 10 and extend in the z axis direction, four roller chains attached to the respective shafts, and extend in the z axis direction, four sprockets enmeshing with the respective chains, and two electric motors (both of which are not illustrated) for respectively rotating and driving, for example, the two sprockets. The sprockets enmesh with the roller chains in response to rotation of the sprockets caused by the power of electric motors to ascend and descend the transportation elevator 16. Note that the shafts may be formed by the support columns 12 of the rack 10. The above mechanism is a mere example, and an arbitrary another mechanism realizing vertical movement of the transportation elevator 16 may be used.

Figure 4:
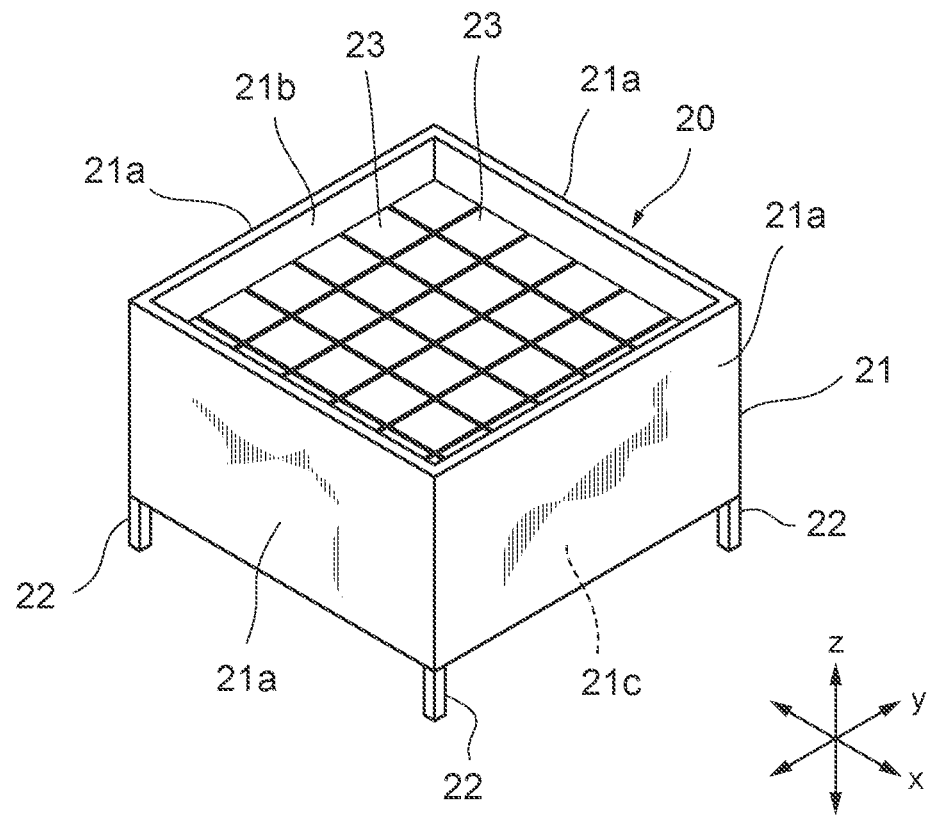
FIG. 4 schematically illustrates an example of the structure of a storage bin of the warehouse system illustrated in FIG. 1.

FIG. 4 schematically illustrates an example of the structure of the storage bin 20 of the warehouse system 1 in the present example. In the present example, the storage bin 20 includes a bin main body 21 defining an internal space of, for example, a cuboid, and four support legs 22 extending downward from four corners of a bottom surface of the bin main body 21. The bin main body 21 includes four sidewalls 21a surrounding four sides, an opening part 21b opened along upper ends of the sidewalls 21a, and a bottom surface 21c closed along lower ends of the sidewalls 21a. Although the opening part 21b is opened in the present example, the opening part 21b may be closed with, for example, a lid or a cover. The sidewalls 21a extend along the xz plane or the yz plane. Furthermore, the bottom surface 21c extends along the xy plane. The storage bin 20 is in contact with the floor 11 with the four support legs 22. The storage bin 20 may be formed by, for example, a resin material. Furthermore, the storage bin 20 may be a foldable bin. A size of the storage bin 20 is preferably set appropriately based on a size of the rack 10 or each floor 11 or a size of an item 23.

The one or more items 23 are contained in the internal space in the bin main body 21. The item 23 can be identified by, for example, a unique Stock Keeping Unit (SKU) set to the item 23. Although the item 23 is, for example, one unit of a product or the like, the item 23 may be a so-called case product packaged in a unit of a plurality of identical products. Furthermore, the one storage bin 20 may contain only the items 23 of one type, or may contain the items 23 of a plurality of types. The storage bin 20 can be identified based on a unique ID set to each storage bin 20. The unique ID of this storage bin 20 is managed in correspondence with the SKU of the item 23 contained in the storage bin 20.

Figure 5:
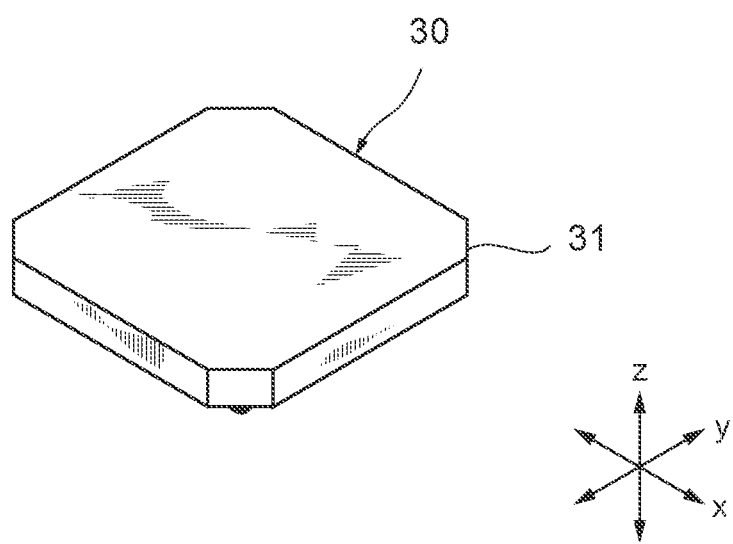
FIG. 5 is a perspective view schematically illustrating an external appearance of a transportation robot in the warehouse system illustrated in FIG. 1.

FIG. 5 is a perspective view schematically illustrating an external appearance of the transportation robot 30 in the warehouse system 1 in the present example. In the present example, a plurality of the transportation robots 30 is preferably arranged on each floor 11 of the rack 10. The transportation robot 30 is, for example, an autonomous running transportation robot including a thin housing 31 of a substantially cuboid shape. The housing 31 is formed by, for example, a resin material. The transportation robot 30 can run along a line 17 (see, for example, FIG. 2) by tracing the line 17 drawn on the floor 11 of the rack 10 (line tracing function). The line 17 is lines of two directions which extend passing center positions of the x axis direction and the y axis direction in, for example, each section 13, and are perpendicular to each other at a center of the section 13. These lines 17 are drawn in all of the sections 13 including the storage areas 14, the movement passages 15, and the transportation elevators 16 of the floor 11.

An upper surface of the housing 31 of the transportation robot 30 extends flat along the xy plane. A height of the transportation robot 30 is set smaller than the height of the support leg 22 of the storage bin 20. Furthermore, an outline of the housing 31 in top view is defined substantially as, for example, a square. Similarly, the length of one side of the transportation robot 30 is set smaller than the length of each side of the storage bin 20. That is, the transportation robot 30 can enter the space below the bin main body 21 from between the pair of mutually neighboring support legs 22 of the storage bin 20. In this regard, the size of the transportation robot 30 is preferably set appropriately based on sizes of the rack 10, each floor 11, and the storage bin 20.

Figure 6:
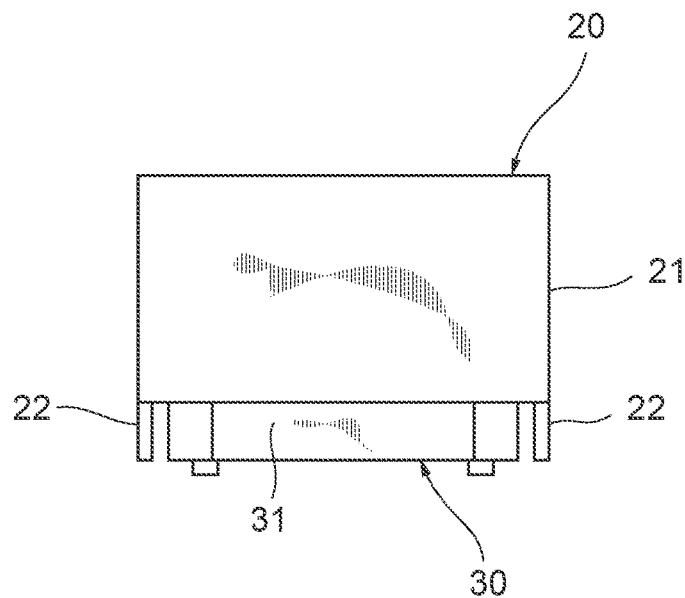
FIG. 6 is a side view illustrating a state where the transportation robot in the warehouse system illustrated in FIG. 5 lifts the storage bin.

The transportation robot 30 can change the height thereof between a first configuration where the height of the upper surface of the housing 31 is set to a first height, and a second configuration where the height is set to a second height higher than the first height. As described above, the transportation robot 30 of the first configuration can enter the space below the bin main body 21 from between the pair of mutually neighboring support legs 22 of the storage bin 20. In this case, when the transportation robot 30 changes the height of the housing 31 from the first configuration to the second configuration, the transportation robot 30 holds the storage bin 20 on the upper surface of the housing 31 as illustrated in FIG. 6. As a result, the storage bin 20 can be lifted from the floor 11. The transportation robot 30 can run in both of the first configuration and the second configuration. That is, the transportation robot 30 can run on the floor 11 while lifting the storage bin 20.

Back to FIG. 1, in the present example, the picking stations 40 are established along, for example, the peripheral edge of the surface of the floor 11 of the rack 10. That is, the picking station 40 is established in, for example, the rack 10. In the present example, for example, the two picking stations 40 are established on the floor 11 of the second floor of the rack 10. The picking station 40 is a station for picking the item 23 from the storage bin 20 transported by the transportation robot 30 from the rack 10. The operator 60 can execute picking work (delivery work) taking a standing posture on, for example, the surface of the floor 11 of the first floor.

The management server 50 manages all of the rack 10, the storage bins 20, the transportation robots 30, the transportation elevators 16, and the picking stations 40 for warehousing, storage, and delivery of the warehouse system 1. This management is realized when a program stored in a storage unit is executed by a control unit as described later. More specifically, operations and processing of the transportation robots 30, the transportation elevators 16, and the picking stations 40 are executed according to information processing described in the program. That is, the information processing described in the program functions as specific means collaborated by software in correspondence with the program, and various hardware resources of the warehouse system 1 when the program is read by the control unit.

Figure 7:
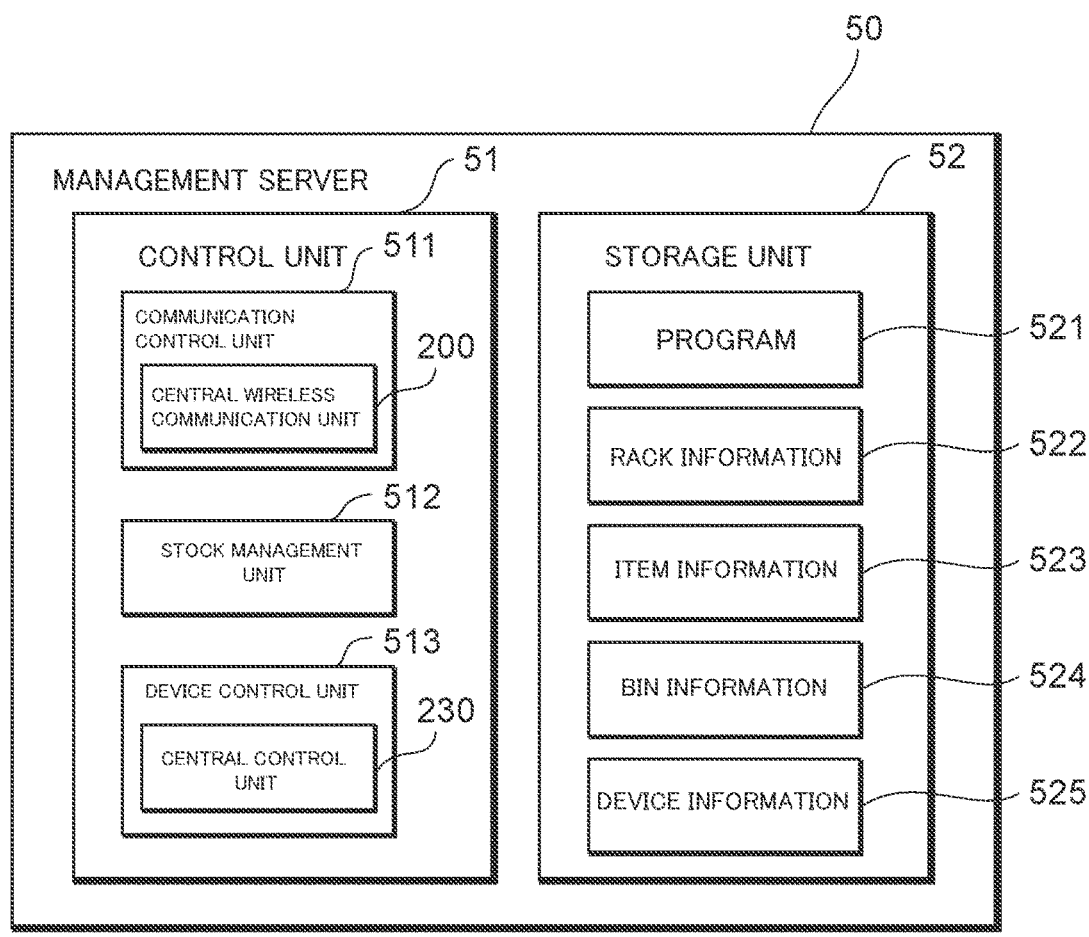
FIG. 7 is a functional block diagram schematically illustrating a configuration of a management server which forms part of the transportation robot control system for a warehouse system according to the embodiment of the present disclosure.

FIG. 7 is a functional block diagram schematically illustrating a configuration of the management server 50 which forms part of the transportation robot control system for a warehouse system 3 according to the embodiment of the present disclosure. As illustrated in FIG. 7, the management server 50 includes a control unit 51 and a storage unit 52. The control unit 51 includes a communication control unit 511, a stock management unit 512, and a device control unit 513. On the other hand, the storage unit 52 stores a program 521, rack information 522, item information 523, bin information 524, and device information 525. The control unit 51 manages the warehouse system 1 by executing the program 521 stored in the storage unit 52. This management server 50 may be realized on a physical server, yet may be realized on, for example, a cloud server.

The communication control unit 511 controls communication between the management server 50 and at least the transportation robot 30 and the terminal of the operator 60 for the picking station 40. A communication method may be, for example, Wi-Fi (registered trademark), Ethernet (registered trademark), Thread, light or the like. The stock management unit 512 manages the stock status of the warehouse system 1. More specifically, the stock management unit 512 associates and manages information (SKU) for identifying each item 23, information related to the number of stocks of each item 23 specified based on the SKU, information (ID) for identifying the storage bin 20 in which the item 23 is stored, and information related to a position of the section 13 of the floor 11 in which the storage bin 20 is stored. Each of these pieces of information is stored as the rack information 522, the item information 523, and the bin information 524 in the storage unit 52.

The device control unit 513 manages and controls at least states and operations of the transportation robots 30 and the picking stations 40. More specifically, the device control unit 513 associates and manages information (robot ID) for identifying the transportation robot 30, information related to a current state of the transportation robot 30, i.e., a charging state of the transportation robot 30, information related to whether or not the transportation robot 30 engages in transportation, information (hereinafter also referred to as "order processing information") related to order processing in which the transportation robot 30 engages in a case where the transportation robot 30 engages in the transportation, and information related to a current position of the transportation robot 30 at the floor 11 of the rack 10 or the picking station 40. The information related to the order processing includes, for example, information related to transportation of which item 23 of the order processing the transportation robot 30 engages in. Each of these pieces of information is stored as the device information 525 in the storage unit 52. Furthermore, the device control unit 513 associates and manages information for identifying the picking station 40, and information related to an order for which picking work is executed at the picking station 40. Each of these pieces of information is stored as the device information 525 in the storage unit 52.

Furthermore, the device control unit 513 generates commands for the transportation robot 30 and the transportation elevator 16 per order processed by the warehouse system 1. More specifically, the device control unit 513 specifies the storage bin 20 for containing the item 23 designated by the order based on each of the above pieces of information, and specifies the transportation robot 30 which needs to be assigned to transport the storage bin 20. The device control unit 513 specifies a movement passage R1 (referred to as a "robot passage" below) of the transportation robot 30 to the section 13 in which the storage bin 20 is stored, and a movement passage R2 (referred to as a "bin passage" below) of the transportation robot 30 from the section 13 to the picking station 40 which is a destination. These pieces of generated information are transmitted as commands to the transportation robot 30 via the communication control unit 511.

Figure 8:
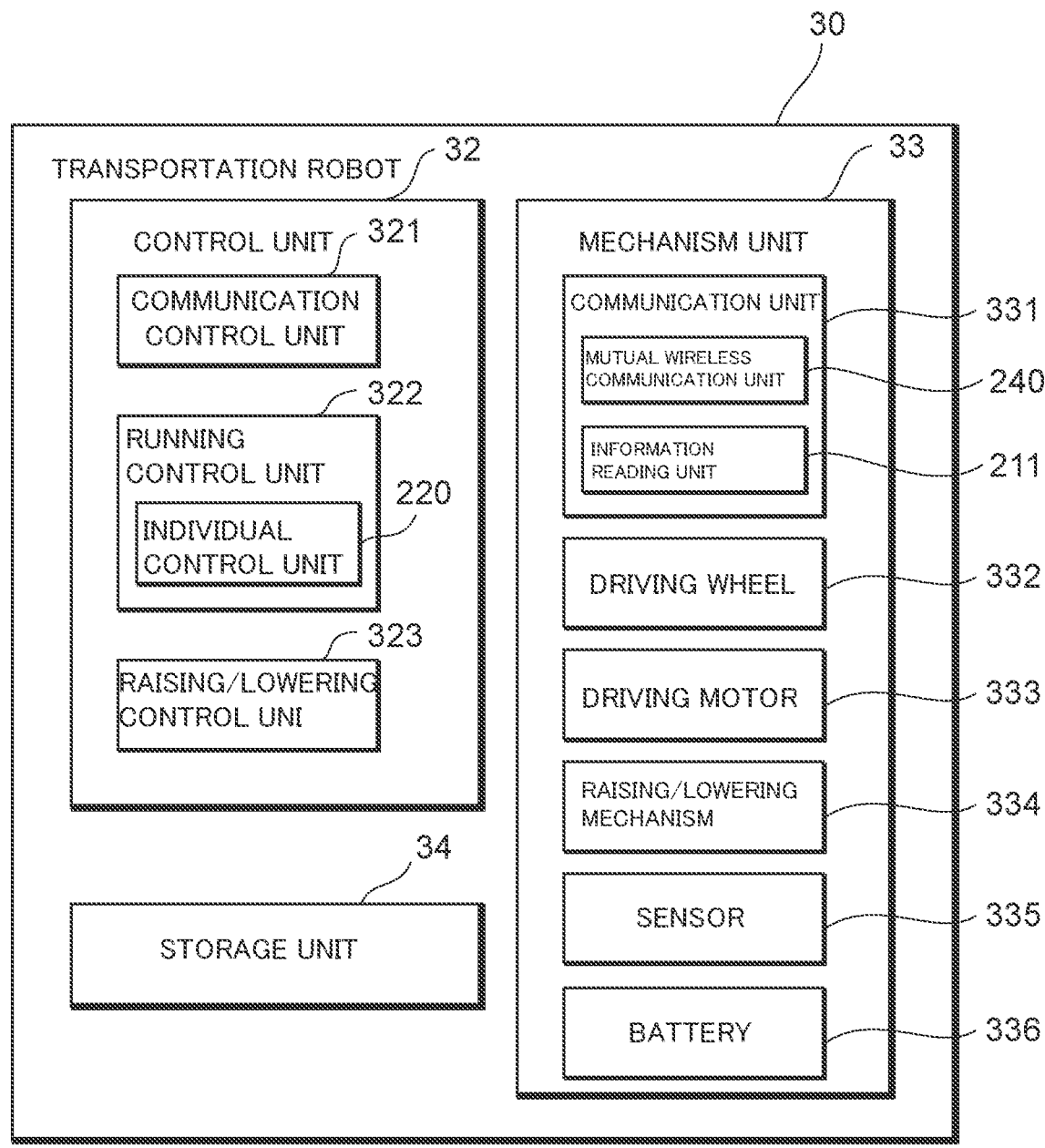
FIG. 8 is a functional block diagram schematically illustrating a configuration of the transportation robot which forms part of the transportation robot control system for a warehouse system according to the embodiment of the present disclosure.

FIG. 8 is a functional block diagram schematically illustrating a configuration of the transportation robot 30 which forms part of the transportation robot control system for a warehouse system 3 according to the embodiment of the present disclosure. As illustrated in FIG. 8, the transportation robot 30 includes a control unit 32, a mechanism unit 33 and a storage unit 34. The control unit 32 includes a communication control unit 321, a running control unit 322 and a raising/lowering control unit 323. The mechanism unit 33 includes a communication unit 331, a plurality of driving wheels 332, a plurality of driving motors 333, a raising/lowering mechanism 334, a sensor 335 and a battery 336. The control unit 32 controls an operation of the transportation robot 30 by executing a program (not illustrated) stored in the storage unit 34. Although the program may be stored in a physical storage unit incorporated in the transportation robot 30, yet may be stored on, for example, a cloud server.

The communication unit 331 establishes communication between at least the management server 50, the transportation elevator 16 and the terminal of the operator 60 for the picking station 40. A communication method may be, for example, Wi-Fi (registered trademark), Ethernet (registered trademark), Thread, light or the like. The communication performed through the communication unit 331 is controlled by the communication control unit 321. The driving wheel 332 is a wheel for realizing the running of the transportation robot 30. A plurality of driving motors 333 drive the driving wheels 332 and the raising/lowering mechanism 334. The driving of the driving wheels 332 is controlled by the running control unit 322. The raising/lowering mechanism 334 establishes the first configuration and the second configuration described above by raising and lowering the housing 31 of the transportation robot 30. The operation of the raising/lowering mechanism 334 is controlled by the raising/lowering control unit 323.

The sensor 335 is, for example, an optical sensor for realizing the line tracing function described previously. More specifically, the sensor 335 is used to control the running of the transportation robot 30 along the line 17 by reading a boundary of the line 17 drawn in each section 13. Furthermore, although two strips of the lines 17 cross at the center of each section 13, the sensor 335 reads the line 17 perpendicular to the line 17 along which the transportation robot 30 is running, and thus the transportation robot 30 can identify the center position of each section 13. In this way, the transportation robot 30 can stop at, for example, the center position of each section 13. The movement of the transportation robot 30 is controlled by the running control unit 322 based on information from the sensor 335. In the warehouse system 1, the transportation robot control system 3 which serves as the transportation robot control system for a warehouse system according to the embodiment of the present disclosure is provided, and thus the transportation robots 30 are also controlled by the transportation robot control system 3. The battery 336 is, for example, a rechargeable battery. On each floor 11 of the rack 10, one or more charging spots (not illustrated) may be formed which enable charging of the battery 336 of the transportation robot 30 may be formed.

Figure 9:
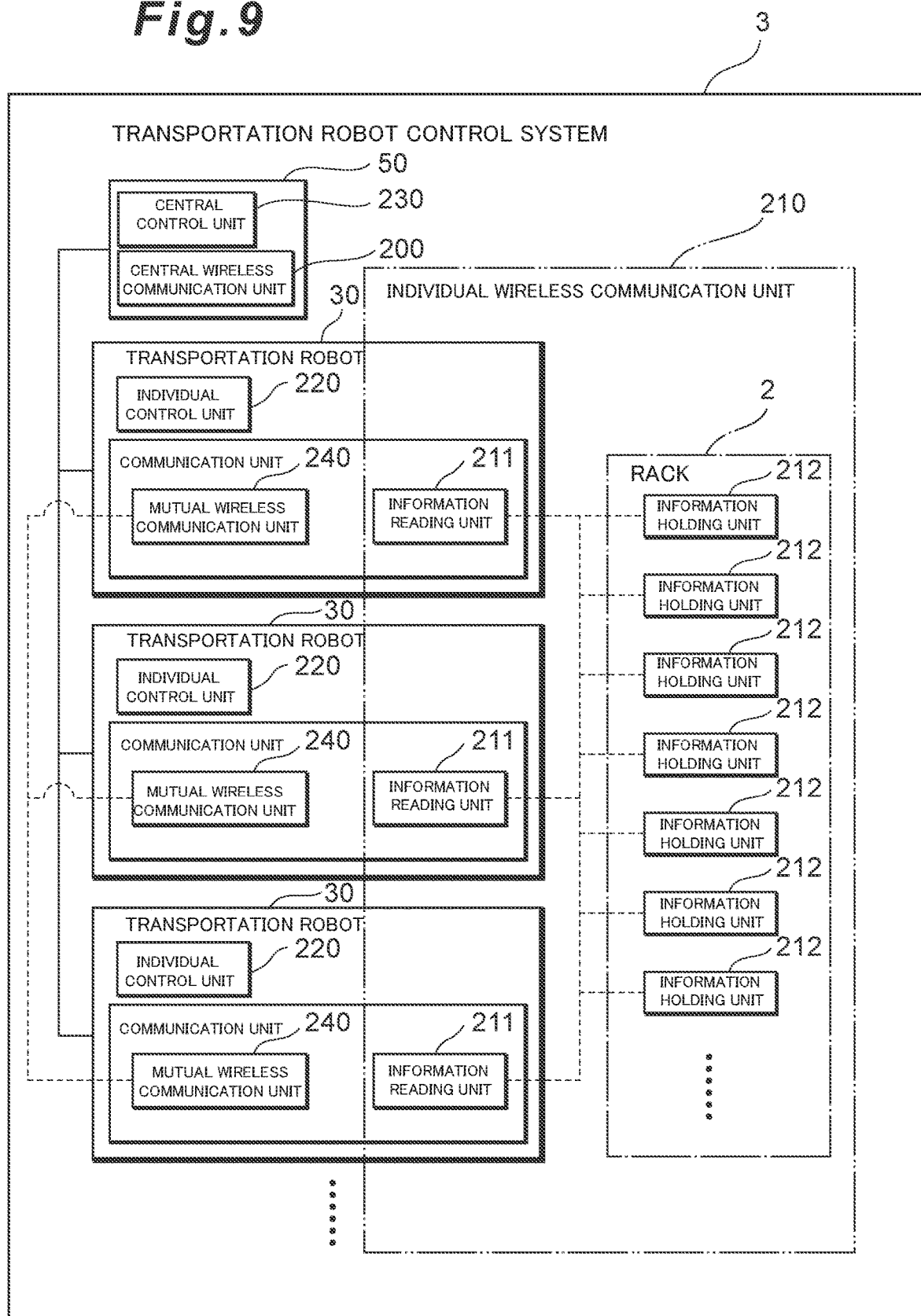
FIG. 9 is a functional block diagram schematically illustrating the configuration of the transportation robot control system for a warehouse system according to the embodiment of the present disclosure.

The transportation robot control system for a warehouse system 3 according to the embodiment of the present disclosure (hereinafter simply referred to as the "transportation robot control system 3") will then be described. FIG. 9 is a functional block diagram schematically illustrating a configuration of the transportation robot control system 3.

The transportation robot control system 3 is a transportation robot control system for a warehouse system that stores items in a rack and includes a plurality of transportation robots for transporting the items stored, and controls, for example, the transportation robots 30 in the warehouse system 1 described above. The transportation robot control system 3 includes: a plurality of transportation robots 30, a central wireless communication unit 200 configured to be able to wirelessly communicate with the transportation robots 30 in a specific region of the warehouse system 1; an individual wireless communication unit 210 configured to be able to wirelessly communicate with the transportation robots 30; and individual control units 220 that respectively control the movements of the transportation robots 30. The individual wireless communication unit 210 includes information reading units 211 that are respectively provided in the transportation robots 30 and a plurality of information holding units 212 that are arranged in the rack 2. Each of the information holding units 212 holds position information indicating a position in the rack 2, at the position, the information holding unit 212 is arranged. The configuration of the transportation robot control system 3 will be specifically described below.

As illustrated in FIG. 9, the transportation robot control system 3 includes, for example, a central control unit 230 for controlling the basic movements of the transportation robots 30 in the warehouse system 1, and the transportation robot control system 3 also includes, for example, mutual wireless communication units 240 which allow each of the transportation robots 30 to wirelessly communicate with the other transportation robots 30. The mutual wireless communication unit 240 allows one of the transportation robots 30 to wirelessly communicate with the other transportation robots 30. The mutual wireless communication unit 240 can wirelessly communicate with the other mutual wireless communication units 240 in a predetermined range. A method for wireless communication between the mutual wireless communication units 240 may be Bluetooth (registered trademark), Wi-Fi (registered trademark), Ethernet (registered trademark), Thread, light or the like.

As illustrated in FIG. 7, the central wireless communication unit 200 is formed in the communication control unit 511 of the control unit 51 in the management server 50, and can wirelessly communicate with the transportation robots 30 in the warehouse system 1. As illustrated in FIG. 7, the central control unit 230 is formed in the device control unit 513 of the control unit 51 in the management server 50 to control the transportation robots 30 in the warehouse system 1 by wireless communication from the central wireless communication unit 200. As described above, the central wireless communication unit 200 can wirelessly communicate with the transportation robots 30 in the specific region of the warehouse system 1. For example, the central wireless communication unit 200 can wirelessly communicate with the transportation robots 30 in the picking stations 40. The specific region in which the central wireless communication unit 200 can wirelessly communicate with the transportation robots 30 is not limited to the picking stations 40, and may be another region. The transportation robot control system 3 may include a plurality of central wireless communication units 200, and in the warehouse system 1, a plurality of central wireless communication units 200 may be provided.

As illustrated in FIG. 8, the information reading unit 211 of the individual wireless communication unit 210 is formed in the communication unit 331 of the mechanism unit 33 included in each of the transportation robots 30, and the mutual wireless communication unit 240 is likewise formed in the communication unit 331 of the mechanism unit 33 included in each of the transportation robots 30. As illustrated in FIG. 8, the individual control unit 220 is formed in the running control unit 322 of the control unit 32 included in each of the transportation robots 30.

The individual wireless communication unit 210 includes a plurality of information holding units 212. For example, the individual wireless communication unit 210 includes a sufficient number of information holding units 212 which are uniformly distributed on the floors 11 in the rack 2, and the information holding units 212 are uniformly distributed on the floors 11 in the rack 2. For example, the information holding units 212 are provided in all the sections 13 of the rack 2. In the present embodiment, one information holding unit 212 is embedded in the center of each of the sections 13. The form of the arrangement of the information holding units 212 may be another form.

When each of the information reading units 211 approaches the vicinity of the information holding unit 212, the information reading unit 211 establishes wireless communication with the information holding unit 212 to be able to read information held by the information holding unit 212. For example, when the information reading unit 211 is in a predetermined range around the information holding unit 212, the information reading unit 211 can read the information of the information holding unit 212. In this way, the information reading unit 211 can recognize the position in which the transportation robot 30 incorporating the information reading unit 211 is present, and each of the transportation robots 30 can grasp the position thereof in the warehouse system 1. In the rack 2, the predetermined range of one of the information holding units 212 does not overlap the predetermined ranges of the other information holding units 212, and the predetermined ranges of the information holding units 212 do not overlap each other. The position information read by the information reading unit 211 is stored in the storage unit 34 of the transportation robot 30 to be controlled (transportation robot 3 which is the object of the control by the individual control unit 220) for a predetermined period or only a predetermined number of pieces of position information read by the information reading unit 211 are stored therein. The position information is stored in the storage unit 34 together with information indicating an order in which pieces of position information are read by the information reading unit 211. In this way, the individual control unit 220 can grasp the current position of the transportation robot 30 which is moving. The individual control unit 220 can also grasp the positions through which the transportation robot 30 has moved.

The individual wireless communication unit 210 is, for example, an RFID, the information reading unit 211 is an RFID reader and the information holding unit 212 is a RF tag. In the information holding unit 212, as described above, the position information is stored that indicates the position in the rack 2 in which the information holding unit 212 is arranged. For example, each of the sections 13 on each of the floors 11 is identified by the floor number of the floor 11, a number in the x axis direction and a number in the y axis direction (address), and each of the information holding units 212 stores, as the position information, the information indicating the floor number of the floor 11 on which the information holding unit 212 is provided and the information (address information) indicating the number in the x axis direction and the number in the y axis direction in the section 13. The individual wireless communication unit 210 is not limited to RFID. For example, the information holding unit 212 of the individual wireless communication unit 210 may be a QR code, and the information reading unit 211 may be a QR code reader. The information holding unit 212 of the individual wireless communication unit 210 is not limited as long as the information holding unit 212 can transmit the position information of the information holding unit 212 in the rack 2 as described previously, and the information reading unit 211 is also not limited as long as the information reading unit 211 can receive the information transmitted by the information holding unit 212.

The basic movement of each of the transportation robots 30 in the warehouse system 1 is controlled by the central control unit 230 in the management server 50 and the individual control unit 220 of the running control unit 220 in each of the transportation robots 30. The basic movement of each of the transportation robots 30 in the warehouse system 1 is controlled based on information from the line sensor 335 which traces the lines 17 provided on each of the floors 11 and the position information read from the information holding units 212 by the information reading units 211. The control of the basic movement of each of the transportation robots 30 in the warehouse system 1 will be described below.

The central control unit 230 identifies, based on the information stored in the storage unit 52, the storage bin 20 which stores the item 23 specified by each order, and identifies the transportation robot 30 which needs to be assigned to transport the identified storage bin 20. Then, the central control unit 230 identifies: the robot route R1 (movement route) of the identified transportation robot up to the section 13 in which the identified storage bin 20 is stored; and the bin route R2 (movement route) of the transportation robot 30 from the section 13 in which the identified storage bin 20 is stored to the picking station 40 serving as a destination. In order to identify them, the central control unit 230 refers to, for example, information indicating the order (order information), information for identifying the transportation robot 30 (robot ID), information on the charging state of the transportation robot 30, information on whether or not the transportation robot 30 performs transportation, information on order processing performed by the transportation robot 30 when the transportation robot 30 performs transportation, information on the current position of the transportation robot 30 on the floor 11 in the rack 10 or at the picking station 40 and the like.

The central control unit 230 generates individual route information R indicating the robot route R1 and the bin route R2 serving as the movement route of the transportation robot 30 identified for the order information, and transmits the generated individual route information R via the central wireless communication unit 200 to the communication unit 331 of the identified transportation robot 30. The individual route information R includes information indicating the identified storage bin 20 and the information (robot ID) indicating the identified transportation robot 30, and the communication control unit 511 identifies, based on the robot ID indicating the identified transportation robot 30, the transportation robot 30 to which the individual route information R is transmitted and transmits, with the central wireless communication unit 200, the individual route information R to the communication unit 331 of the identified transportation robot 30. When the identified transportation robot 30 is in the picking station 40 serving as a region in which the central wireless communication unit 200 can perform wireless communication, the central wireless communication unit 200 transmits the individual route information R to the communication unit 331 of the identified transportation robot 30.

When the communication unit 331 of the transportation robot 30 receives the individual route information R, the individual control unit 220 of the running control unit 322 in the transportation robot 30 controls the driving motors 333 of the mechanism unit 33 based on the received individual route information R (information of the robot route R1), and thereby drives the driving wheels 332 to move the transportation robot 30 along the robot route R1 included in the individual route information R. The individual control unit 220 controls the driving motors 333 of the mechanism unit 33 such that the lines 17 provided on the floor 11 trace the sensor 335, and thus the movement of the transportation robot 30 is controlled. The individual control unit 220 also grasps the current position of the transportation robot 30 based on the latest position information read by the information reading unit 211 of the transportation robot 30, and controls the driving motors 333 of the mechanism unit 33 such that the transportation robot 30 moves along the robot route R1. In this way, the transportation robot 30 moves to the section 13 at the end of the robot route R1 of the received individual route information R. When the transportation robot 30 arrives at this section 13 serving as a stopping point, the transportation robot 30 moves up the raising/lowering mechanism 334 by the control of the driving motors 333 performed by the raising/lowering control unit 323, and thus the housing 31 is lifted from the first height to the second height, with the result that the first configuration is changed to the second configuration. In this way, the transportation robot 30 lifts the identified storage bin 20.

Then, the individual control unit 322 of the transportation robot 30 controls the driving motors 333 of the mechanism unit 33 based on the received individual route information R (information of the bin route R2), and thereby drives the driving wheels 332 to move the transportation robot 30 along the bin route R2 included in the individual route information. The individual control unit 220 controls the driving motors 333 of the mechanism unit 33 such that the lines 17 provided on the floor 11 trace the sensor 335, and thus the movement of the transportation robot 30 is controlled. The individual control unit 220 also grasps the current position of the transportation robot 30 based on the latest position information read by the information reading unit 211 of the transportation robot 30, and controls the driving motors 333 of the mechanism unit 33 such that the transportation robot 30 moves along the bin route R2. In this way, the transportation robot 30 moves to the picking station 40 serving as the destination indicated by the bin route R2 of the received individual route information R. When the transportation robot 30 arrives at the picking station 40 serving as the destination, the transportation robot 30 lowers the raising/lowering mechanism 334 by the control of the driving motors 333 performed by the raising/lowering control unit 323, and thus the housing 31 is lowered from the second height to the first height, with the result that the second configuration is changed to the first configuration. In this way, the storage bin 20 is placed on the picking station 40, and thus the transportation robot 30 can move in a single state where the storage bin 20 is not loaded.

As described above, each of the transportation robots 30 is controlled by the individual control unit 220 of the running control unit 220 based on the individual route information R transmitted from the central wireless communication unit 200 of the management server 50, the information from the sensor 335 and the position information read by the information reading unit 211, and thereby moves to the section 13 in which the storage bin 20 for each order is stored, with the result that the transportation robot 30 loads the storage bin 20 for the order to carry it to the picking station 40. As described above, the basic movement of the transportation robot 30 is controlled. The individual route information R is not limited to the information which includes the robot route R1 and the bin route R2 indicating the stopping point and the destination, and may be information which includes one of the robot route R1 and the bin route R2 or information which includes various combinations of the robot route R1 and the bin route R2. The form of the basic movement of the transportation robot 30 is not limited to the form described above.

As described above, in the transportation robot control system 3, the control of the basic movement of the transportation robot 30 in the warehouse system 1 is performed based on only the information included in the transportation robot 30, that is, the information stored in the storage unit 34 of the transportation robot 30 and the information read from the information holding unit 212 in the rack 2 by the information reading unit 211 of the transportation robot 30. Hence, while the control of the basic movement of the transportation robot 30 is being performed, the transmission of the information of the central wireless communication unit 200 in the management server 50 is not needed. In this way, it is possible to reduce the amount of communication from the management server 50 to each of the transportation robots 30. Since the control of the basic movement of the transportation robot 30 requires only wireless communication between the information reading unit 211 and the information holding unit 212 which are close to each other, it is possible to prevent a failure to receive wireless information for the control of the movement depending on the position in the warehouse system 1. In this way, it is possible to control a large number of transportation robots 30 by wireless communication stably with high reliability.

When the information reading unit 211 and the information holding unit 212 for the mutual wireless communication unit 240 are assumed to be respectively a RFID reader and a RFID tag, it is possible to further increase the speed of wireless communication between the information reading unit 211 and the information holding unit 212, and even when the speed of the movement of the transportation robot 30 is further increased, it is possible to achieve stable and highly reliable control.

As described above, the individual control unit 220 controls the basic movement of the transportation robot 30 (hereinafter also referred to as the "transportation robot to be controlled") being the object of the control in which the individual control unit 220 is provided. The individual control unit 220 performs collision avoidance processing on the transportation robot 30 to be controlled. In the collision avoidance processing, in the warehouse system 1, the transportation robot 30 to be controlled by the individual control unit 220 is prevented from colliding with another transportation robot 30 (hereinafter also referred to as the "transportation robot to be uncontrolled") to be uncontrolled by the individual control unit 220.

Figure 10:
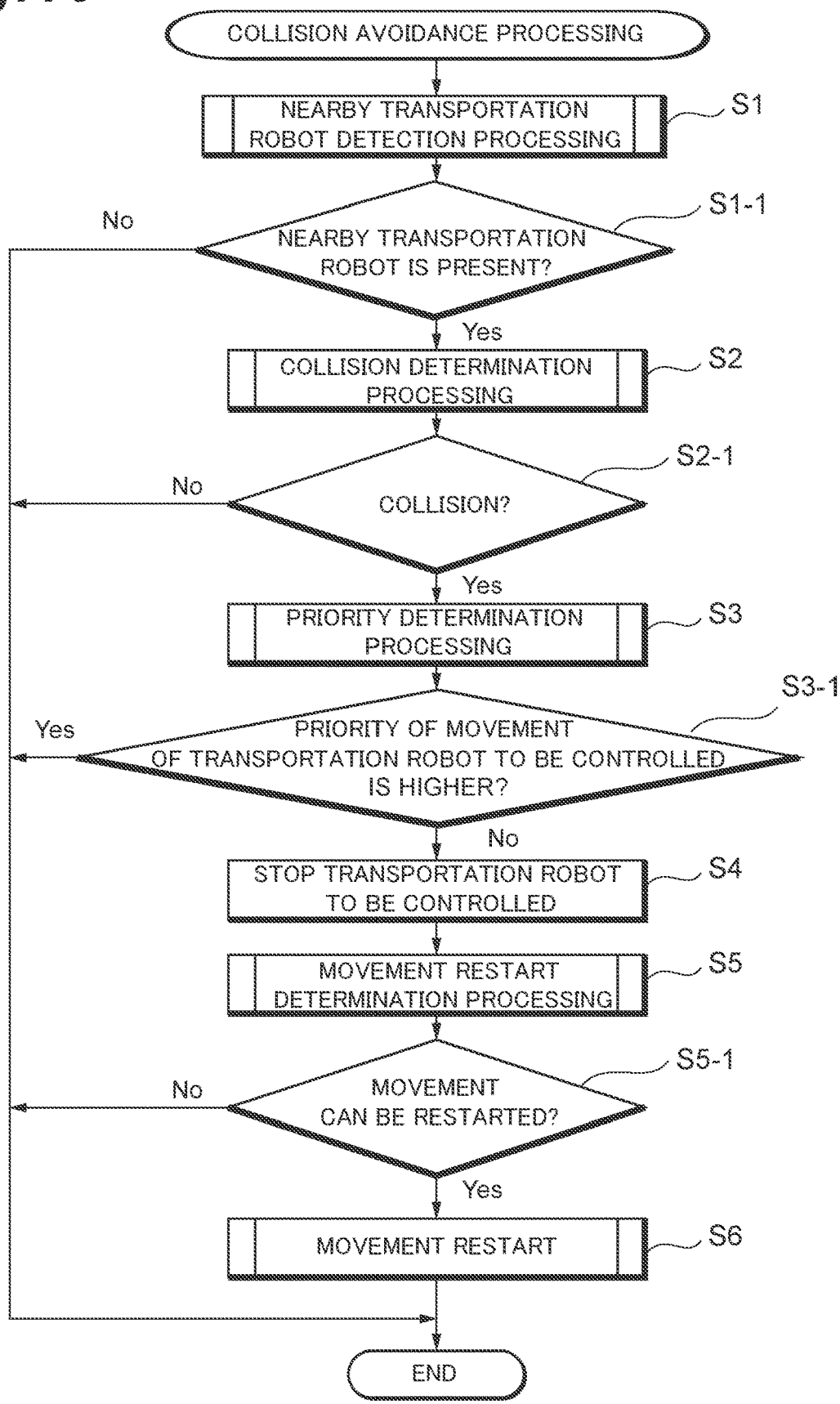
FIG. 10 is a flowchart illustrating an example of collision avoidance processing performed by the transportation robot control system for a warehouse system according to the embodiment of the present disclosure.

FIG. 10 is a flowchart of the collision avoidance processing performed by the individual control unit 220. The collision avoidance processing is performed on the transportation robot 30 which is moving. As illustrated in FIG. 10, in the collision avoidance processing, the individual control unit 220 in each of the transportation robots 30 first performs nearby transportation robot detection processing (step S1). In the nearby transportation robot detection processing, whether or not the transportation robot 30 to be uncontrolled is present in a predetermined range around the transportation robot 30 to be controlled is determined. When it is determined that the transportation robot 30 to be uncontrolled is not present in the predetermined range (no in step S1-1), the individual control unit 220 determines that the transportation robot 30 to be controlled is prevented from colliding with the transportation robot 30 to be uncontrolled, and the collision avoidance processing is completed. On the other hand, when it is determined that the transportation robot 30 to be uncontrolled is present in the predetermined range (yes in step S1-1), the individual control unit 220 performs collision determination processing (step S2).

In the collision determination processing (step S2), the individual control unit 220 determines whether or not the transportation robot 30 to be controlled collides with the transportation robot 30 to be uncontrolled in the predetermined range which is detected in step S1. When the individual control unit 220 determines that the transportation robot 30 to be controlled does not collide with the transportation robot 30 to be uncontrolled in the predetermined range which is detected in step S1 (no in step S2-1), the collision avoidance processing is completed. On the other hand, when the individual control unit 220 determines that the transportation robot 30 to be controlled collides with the transportation robot 30 to be uncontrolled in the predetermined range which is detected in step S1 (yes in step S2-1), the individual control unit 220 performs priority determination processing (step S3).

In the priority determination processing (step S3), the priorities of the movements of the transportation robot 30 to be controlled and the transportation robot 30 to be uncontrolled which is determined to collide therewith in step S2 are determined. When the individual control unit 220 determines that the priority of the movement of the transportation robot 30 to be controlled is higher than the priority of the movement of the transportation robot 30 to be uncontrolled (yes in step S3-1), the individual control unit 220 in the transportation robot 30 to be uncontrolled is caused to perform processing for collision avoidance, and the collision avoidance processing is completed. On the other hand, when the individual control unit 220 determines that the priority of the movement of the transportation robot 30 to be controlled is lower than the priority of the movement of the transportation robot 30 to be uncontrolled (no in step S3-1), the individual control unit 220 performs stop processing for stopping the transportation robot 30 to be uncontrolled (step S4).

After the transportation robot 30 to be uncontrolled is stopped, the individual control unit 220 performs movement restart determination processing (step S5). In the movement restart determination processing, whether or not the movement of the transportation robot 30 to be controlled can be safely restarted without colliding with the transportation robot 30 to be uncontrolled is determined, and the movement restart determination processing is performed by determining whether or not a predetermined movement restart requirement is satisfied. The individual control unit 220 performs the movement restart determination processing until the predetermined movement restart requirement is determined to be satisfied (no in step S5-1), and when the predetermined movement restart requirement is determined to be satisfied (yes in step S5-1), the individual control unit 220 performs movement restart processing for restarting the movement of the transportation robot 30 to be controlled (step S6), and the collision avoidance processing is completed.

The collision avoidance processing may be performed on the transportation robot 30 to be uncontrolled and one transportation robot 30 to be uncontrolled or may be performed on the transportation robot 30 to be controlled and a plurality of transportation robots 30 to be uncontrolled. In other words, when in the nearby transportation robot detection processing (step S1), a plurality of transportation robots 30 to be uncontrolled are determined to be present in the predetermined range, the collision avoidance processing is performed on the transportation robot 30 to be controlled and a plurality of transportation robots 30 to be uncontrolled.

Figure 11:
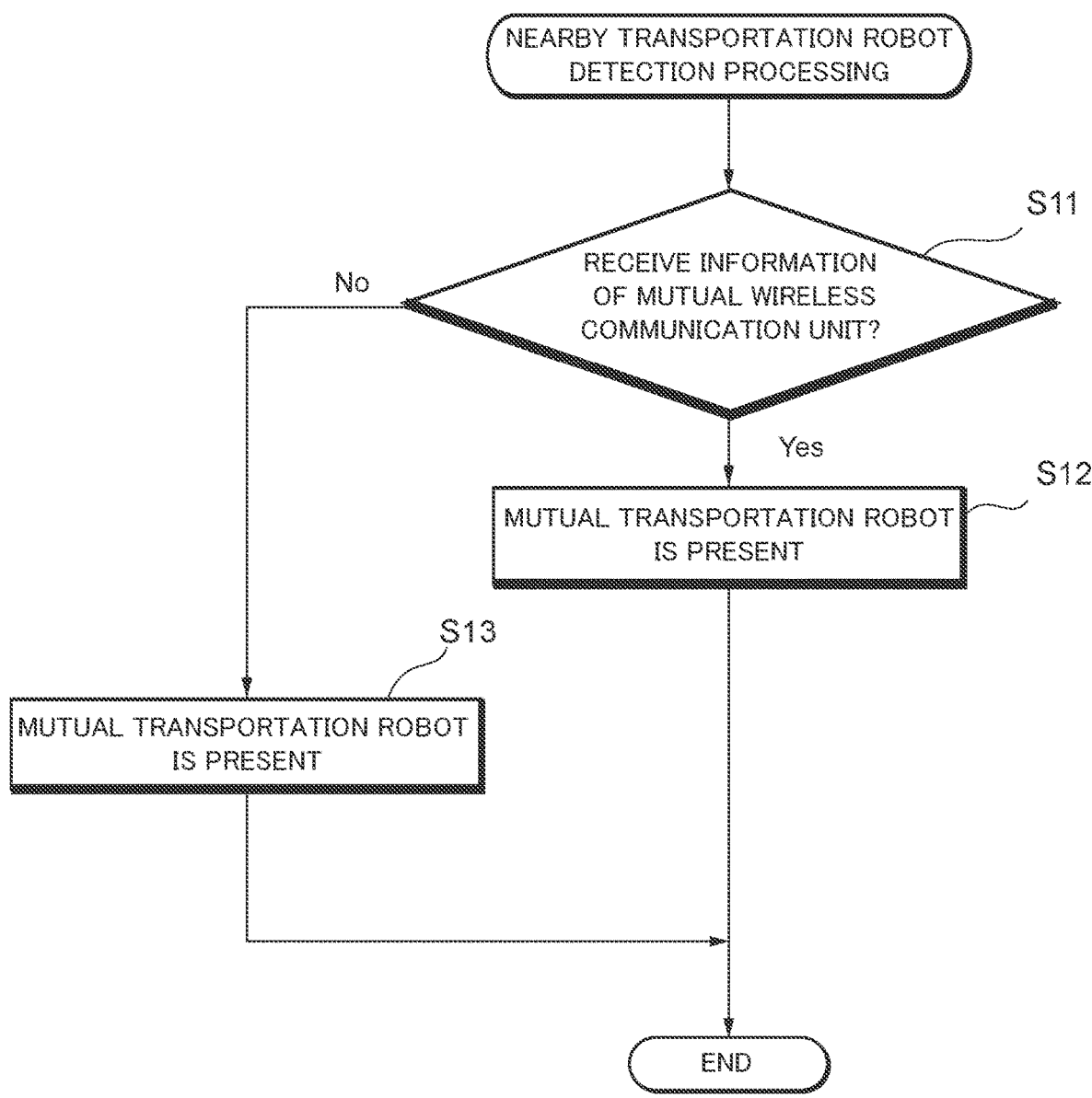
FIG. 11 is a flowchart illustrating an example of nearby transportation robot detection processing in the collision avoidance processing illustrated in FIG. 10.
Figure 13:
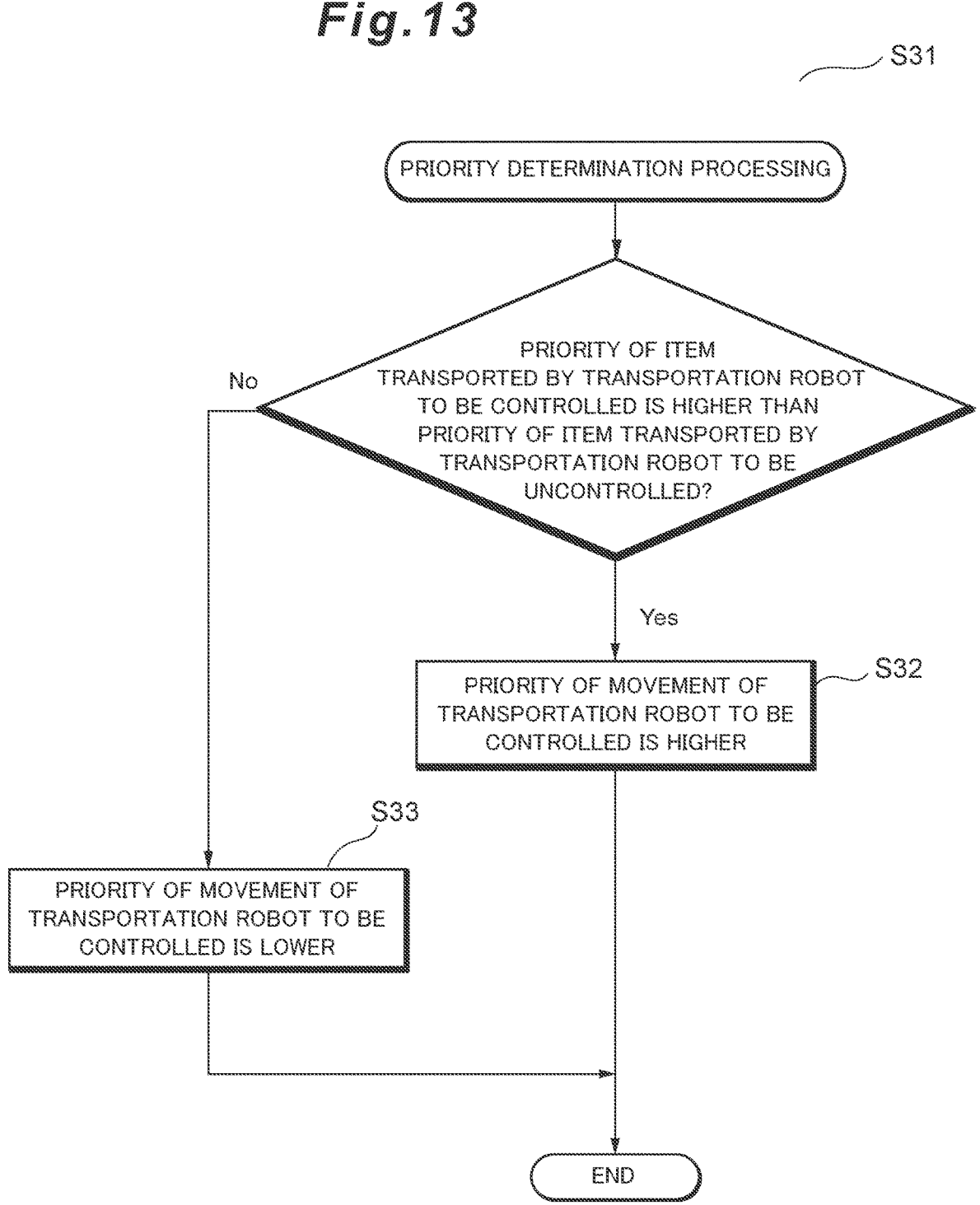
FIG. 13 is a flowchart illustrating an example of priority determination processing in the collision avoidance processing illustrated in FIG. 10.
Figure 14:
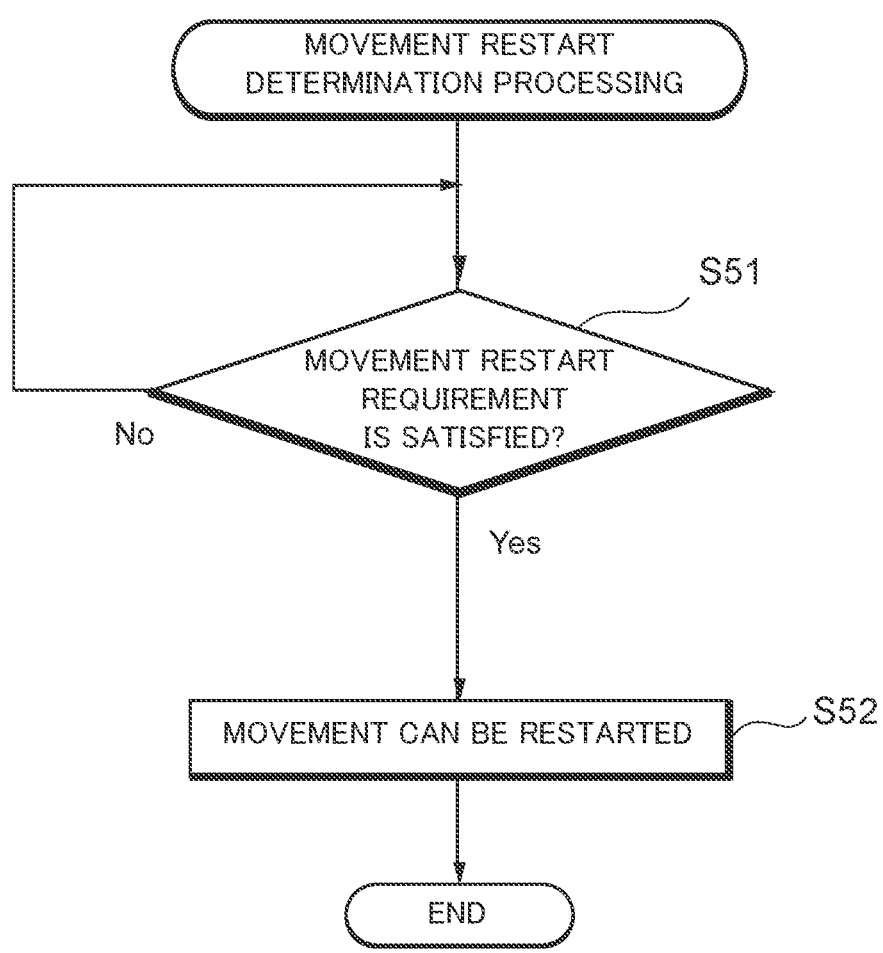
FIG. 14 is a flowchart illustrating an example of movement restart determination processing in the collision avoidance processing illustrated in FIG. 10.

The individual types of processing (steps S1 to S6) in the collision avoidance processing described above will then be specifically described. FIG. 11 is a flowchart of the nearby transportation robot detection processing (step S1), FIG. 12 is a flowchart of the collision determination processing (step S2), FIG. 13 is a flowchart of the priority determination processing (step S3) and FIG. 14 is a flowchart of the movement restart determination processing (step S5).

As illustrated in FIG. 11, in the nearby transportation robot detection processing (step S1), as described above, whether or not the transportation robot 30 to be uncontrolled is present in the predetermined range around the transportation robot 30 to be controlled is determined. In the nearby transportation robot detection processing, the individual control unit 220 first checks whether or not the mutual wireless communication unit 240 has received information from the mutual wireless communication unit 240 of the transportation robot 30 to be uncontrolled (step S11). When the mutual wireless communication unit 240 has received information from the mutual wireless communication unit 240 of the transportation robot 30 to be uncontrolled (yes in step S11), the individual control unit 220 determines that the transportation robot 30 to be uncontrolled which is close to the transportation robot 30 to be controlled is present (step S12), and the nearby transportation robot detection processing is completed. On the other hand, when the mutual wireless communication unit 240 has not received information from the mutual wireless communication unit 240 of the transportation robot 30 to be uncontrolled (no in step S11), the individual control unit 220 determines that the transportation robot 30 to be uncontrolled which is close to the transportation robot 30 to be controlled is not present (step S13), and the nearby transportation robot detection processing is completed. In the nearby transportation robot detection processing, the individual control unit 220 may determine, based on other information, whether or not the transportation robot 30 to be uncontrolled which is close to the transportation robot 30 to be controlled is present.

Figure 12:
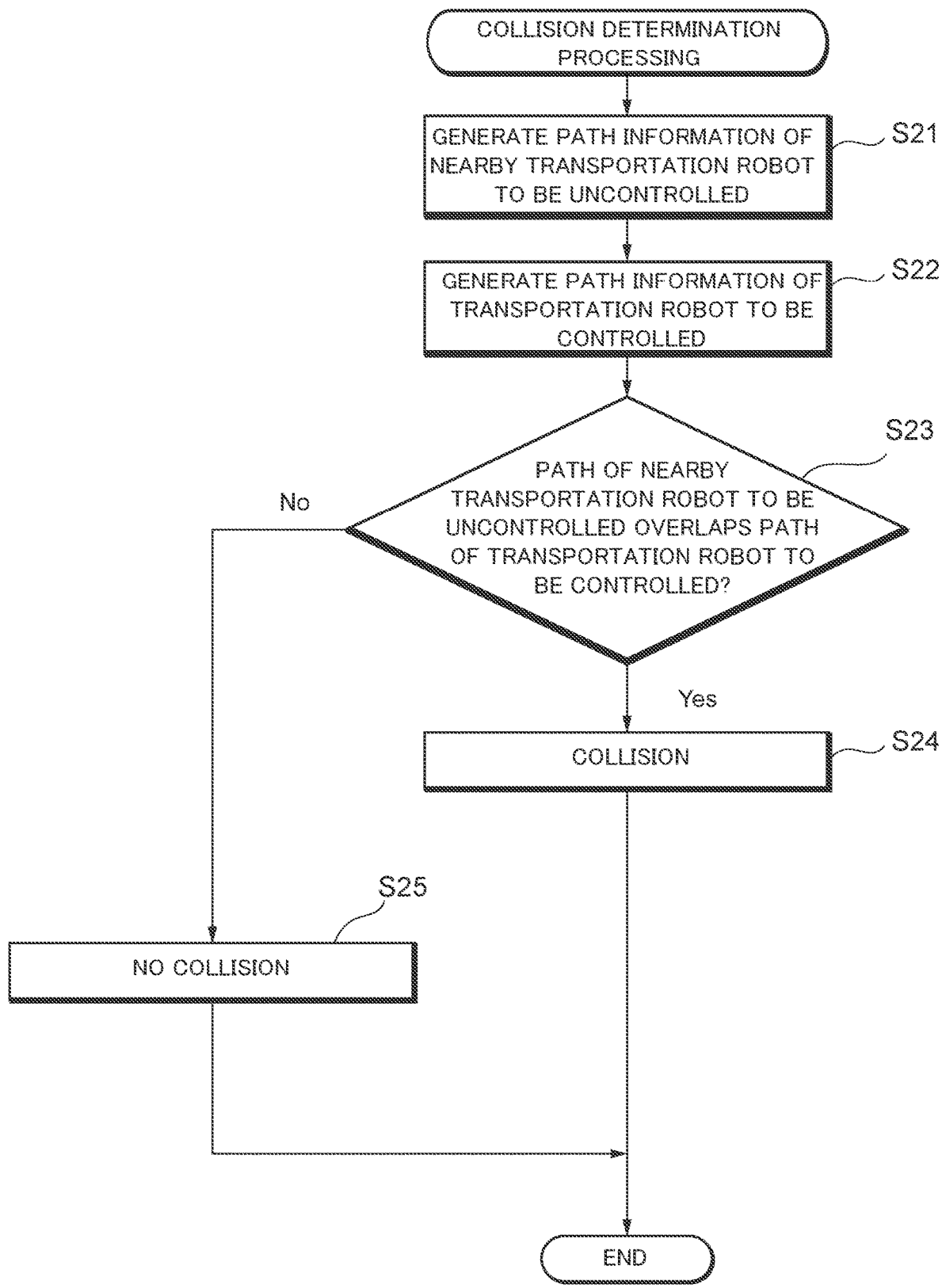
FIG. 12 is a flowchart illustrating an example of collision determination processing in the collision avoidance processing illustrated in FIG. 10.

As illustrated in FIG. 12, in the collision determination processing (step S2), whether or not the transportation robot 30 to be uncontrolled which is detected in the nearby transportation robot detection processing and is close to the transportation robot 30 to be controlled collides with the transportation robot 30 to be controlled is determined. In the collision determination processing, the individual control unit 220 first refers to the position information and the individual route information R that are received by the mutual wireless communication unit 240 and are related to the nearby transportation robot 30 to be uncontrolled, calculates the future position of the nearby transportation robot 30 to be uncontrolled and generates the path information of the nearby transportation robot to be uncontrolled which indicates the future path of the nearby transportation robot 30 to be uncontrolled (step S21). The path information of the nearby transportation robot to be uncontrolled is generated, for example, by calculating information indicating the positions of the sections 13 from the section 13 indicated by the latest position information of the nearby transportation robot 30 to be uncontrolled to the section 13 located after a predetermined period or located a predetermined distance on the robot route R1 or the bin route R2.

Then, the individual control unit 220 refers to the position information and the individual route information stored in the storage unit 34 of the transportation robot 30 to be controlled, calculates the future position of the transportation robot 30 to be controlled and generates the path information of the transportation robot to be controlled which indicates the future path of the transportation robot 30 to be controlled (step S22). For example, as with the path information of the nearby transportation robot to be uncontrolled, the path information of the transportation robot to be controlled is generated by calculating information indicating the positions of the sections 13 from the section 13 indicated by the latest position information of the transportation robot 30 to be controlled to the section 13 located after a predetermined period or located a predetermined distance on the robot route R1 or the bin route R2.

Then, the individual control unit 220 compares the path information of the nearby transportation robot to be uncontrolled which is generated in step S21 with the path information of the transportation robot to be controlled which is generated in step S22, and thereby determines whether or not the path of the nearby transportation robot 30 to be uncontrolled and the path of the transportation robot 30 to be controlled overlap each other (step S23). More specifically, whether or not the path of the nearby transportation robot 30 to be uncontrolled and the path of the transportation robot 30 to be controlled overlap each other is determined by whether or not the position information (address information of the section 13) included in the path information of the nearby transportation robot to be uncontrolled includes the same information as the position information (address information of the section 13) included in the path information of the transportation robot to be controlled. When the position information (address information of the section 13) included in the path information of the nearby transportation robot to be uncontrolled includes the same information as the position information (address information of the section 13) included in the path information of the transportation robot to be controlled, the individual control unit 220 determines that the path of the nearby transportation robot 30 to be uncontrolled and the path of the transportation robot 30 to be controlled overlap each other (yes in step S23). On the other hand, when the position information (address information of the section 13) included in the path information of the nearby transportation robot to be uncontrolled does not include the same information as the position information (address information of the section 13) included in the path information of the transportation robot to be controlled, the individual control unit 220 determines that the path of the nearby transportation robot 30 to be uncontrolled and the path of the transportation robot 30 to be controlled do not overlap each other (no in step S23).

When the individual control unit 220 determines that the path of the nearby transportation robot 30 to be uncontrolled and the path of the transportation robot 30 to be controlled overlap each other (yes in step S23), the individual control unit 220 determines that the nearby transportation robot 30 to be uncontrolled may collide with the transportation robot 30 to be controlled (step S24), and the collision determination processing is completed. On the other hand, when the individual control unit 220 determines that the path of the nearby transportation robot 30 to be uncontrolled and the path of the transportation robot 30 to be controlled do not overlap each other (no in step S23), the individual control unit 220 determines that the nearby transportation robot 30 to be uncontrolled is prevented from colliding with the transportation robot 30 to be controlled (step S25), and the collision determination processing is completed. In the collision determination processing, the individual control unit 220 may determine, based on other information, whether or not the transportation robot 30 to be controlled may collide with the nearby transportation robot 30 to be uncontrolled.

As illustrated in FIG. 13, in the priority determination processing (step S3), the priorities of the movements of the transportation robot 30 to be controlled and the transportation robot 30 to be uncontrolled which is determined to collide therewith in the collision determination processing are determined, and the individual control unit 220 determines the priorities based on priority information indicating the priorities of the transportation robot 30 to be controlled and the transportation robot 30 to be uncontrolled. The priority information indicates the movement of which one of the transportation robots 30 is prioritized, and is determined based on, for example, the item 23 which is transported. For example, the priority information is previously set, is received from the management server 50 and is stored in the storage unit 34 of each of the transportation robots 30. In the priority information, for example, the item 23 or the storage bin 20 which needs to be urgently transported is ranked. The individual control unit 220 determines the priorities based on whether or not the transportation robot 30 is transporting the item 23.

More specifically, in the priority determination processing, the individual control unit 220 refers to the priority information to compare the priority of the item 23 transported by the transportation robot 30 to be controlled with the priority of the item 23 transported by the transportation robot 30 to be uncontrolled which is determined to collide with the transportation robot 30 to be controlled, and thereby determines whether or not the priority of the item 23 transported by the transportation robot 30 to be controlled is higher than the priority of the item 23 transported by the transportation robot 30 to be uncontrolled (step S31). The priority of the transportation robot 30 which is not transporting the item 23 is determined to be the lowest. In the comparison of the priorities in step S31, the individual control unit 220 identifies the item 23 transported by the transportation robot 30 to be controlled by referring to information on the item 23 stored in the storage unit 34 and included in information on the order processing performed by the transportation robot 30 to be controlled. On the other hand, in the comparison of the priorities in step S31, the individual control unit 220 identifies the item 23 transported by the transportation robot 30 to be uncontrolled by referring to information on the item 23 received by the mutual wireless communication unit 240 and included in information on the order processing performed by the transportation robot 30 to be uncontrolled.

When in step S31, the individual control unit 220 determines that the priority of the item 23 transported by the transportation robot 30 to be controlled is higher than the priority of the item 23 transported by the transportation robot 30 to be uncontrolled (yes in step S31), the individual control unit 220 generates the result of the determination indicating that the priority of the movement of the transportation robot 30 to be controlled is higher (step S32), and the priority determination processing is completed. On the other hand, when in step S31, the individual control unit 220 determines that the priority of the item 23 transported by the transportation robot 30 to be controlled is lower than the priority of the item 23 transported by the transportation robot 30 to be uncontrolled (no in step S31), the individual control unit 220 generates the result of the determination indicating that the priority of the movement of the transportation robot 30 to be controlled is lower (step S33), and the priority determination processing is completed. In the priority determination processing, the individual control unit 220 may determine, based on other information, the priorities of the movements of the transportation robot 30 to be controlled and the transportation robot 30 to be uncontrolled. When the priorities of the movements of the transportation robot 30 to be controlled and the transportation robot 30 to be uncontrolled are the same as each other, the priorities of the movements of the transportation robot 30 to be controlled and the transportation robot 30 to be uncontrolled are determined, for example, by comparison of the robot IDs and wireless communication of the mutual wireless communication units 240.

In the stop processing (step S4), the individual control unit 220 controls the driving motors 330 of the transportation robot 30 to be controlled to stop the driving motors 330, and thus the transportation robot 30 to be controlled which is moving is stopped.

As illustrated in FIG. 14, in the movement restart determination processing (step S5), whether or not the movement of the transportation robot 30 to be controlled which has been stopped can be safely restarted without colliding with the transportation robot 30 to be uncontrolled is determined, and the movement restart determination processing is performed by determining whether or not the predetermined movement restart requirement is satisfied. In the movement restart determination processing, the individual control unit 220 first determines whether or not the movement restart requirement is satisfied (step S51). The movement restart requirement is, for example, a previously set condition such as a predetermined elapsed time after the stop of the driving motors 330 in the stop processing or a predetermined separation distance between the transportation robot 30 to be uncontrolled which is determined to collide and the transportation robot 30 to be uncontrolled. For example, the individual control unit 220 refers to information indicating the predetermined elapsed time stored in the storage unit 34, checks whether or not the predetermined elapsed time has passed after the stop of the driving motors 330 and determines that the movement restart requirement is satisfied after it is confirmed that the predetermined elapsed time has passed. For example, the individual control unit 220 calculates the current position of the transportation robot 30 to be uncontrolled from the position information and the individual route information R of the transportation robot 30 to be uncontrolled which are received by the mutual wireless communication unit 240 of the transportation robot 30 to be controlled, compares this with the latest position information of the transportation robot 30 to be controlled which is read by the information reading unit 211 and thereby calculates a distance between the transportation robot 30 to be uncontrolled and the transportation robot 30 to be controlled. Then, the individual control unit 220 checks whether or not the calculated distance exceeds the predetermined separation distance stored in the storage unit 34, and determines that the movement restart requirement is satisfied after it is confirmed that the calculated distance exceeds the predetermined separation distance. The movement restart requirement is not limited to the examples described above and may be based on other information.

When in step S51, the individual control unit 220 determines that the movement restart requirement is satisfied (yes in step S51), the individual control unit 220 determines that the movement of the transportation robot 30 to be controlled which has been stopped can be restarted (step S52), and the movement restart determination processing is completed. On the other hand, when in step S51, the individual control unit 220 determines that the movement restart requirement is not satisfied (no in step S51), the individual control unit 220 continues to determine whether or not the movement restart requirement is satisfied in step S51 until the individual control unit 220 determines that the movement can be restarted.

In the movement restart processing (step S6), the individual control unit 220 controls the driving motors 330 of the transportation robot 30 to be controlled to drive the driving motors 330, and thereby restarts the movement of the transportation robot 30 to be controlled in the individual route. When the individual control unit 220 restarts the movement of the transportation robot 30 to be controlled, the collision avoidance processing on the transportation robot 30 to be uncontrolled which is detected in the nearby transportation robot detection processing (step S1) of the collision avoidance processing is completed.

As described above, when the individual control unit 220 determines that the transportation robot 30 to be uncontrolled which is close to the transportation robot 30 to be controlled is present (steps S1 and S12) and determines that the transportation robot 30 to be uncontrolled which is determined to be close thereto collides with the transportation robot 30 to be controlled (steps S2 and S24), and the priority of the movement of the transportation robot 30 to be controlled is lower than the priority of the movement of the transportation robot 30 to be uncontrolled (steps S3 and S33), the individual control unit 220 stops the transportation robot 30 to be controlled (step S4). Then, when the individual control unit 220 determines that the movement of the transportation robot 30 to be controlled which has been stopped can be safely restarted (steps S5 and S52), the individual control unit 220 restarts the movement of the transportation robot 30 to be controlled.

The individual control unit 220 may repeatedly perform the collision avoidance processing, for example, at predetermined time intervals. In this case, a plurality of pieces of collision avoidance processing may be performed in an overlapping manner. In other words, even when one piece of collision avoidance processing is not completed, a new piece of collision avoidance processing may be performed. On the other hand, the individual control unit 220 may perform a new piece of collision avoidance processing after the completion of one piece of collision avoidance processing.

As described above, in the transportation robot control system 3, it is possible to avoid a collision between the transportation robots 30 in the warehouse system 1. The collision avoidance processing for avoiding a collision between the transportation robots 30 is performed based on only the information included in the transportation robots 30, that is, based on only the information included in the transportation robot 30 to be controlled and the information received from the transportation robot 30 to be uncontrolled by the wireless communication of the mutual wireless communication units 240. Hence, while the collision avoidance processing is being performed, it is not necessary for the central wireless communication unit 200 of the management server 50 to transmit information. Therefore, it is possible to reduce the amount of communication from the management server 50 to each of the transportation robots 30. Since the collision avoidance processing requires only wireless communication using the mutual wireless communication units 240 between the transportation robots 30 which are close to each other and wireless communication in the nearby individual wireless communication unit 210 (the information reading unit 211 and the information holding unit 212), it is possible to prevent a failure to receive wireless information for the collision avoidance processing depending on the position in the warehouse system 1. In this way, it is possible to control a large number of transportation robots 30 by wireless communication stably with high reliability.

When the information reading unit 211 and the information holding unit 212 for the mutual wireless communication unit 240 are assumed to be respectively a RFID reader and a RFID tag, it is possible to further increase the speed of wireless communication between the information reading unit 211 and the information holding unit 212, and even when the speed of the movement of the transportation robot 30 is further increased, it is possible to achieve stable and highly reliable control.

As described above, in the transportation robot control system for a warehouse system 3 according to the embodiment of the present disclosure, it is possible to stably control a large number of transportation robots 30 by wireless communication.

In the transportation robot control system 3, processing for changing the individual route information R transmitted from the central wireless communication unit 200 to each of the transportation robots 30 and processing for acquiring, for example, maintenance information such as the remaining amount in a battery in each transportation robot control system 3 may be performed. In the processing for changing the individual route information R, the central control unit 230 transmits the changed individual route information R to the communication unit 331 of the transportation robot 30 closest to the transportation robot 30 to be controlled in the communication range of the central wireless communication unit 200, and transmits, via this transportation robot 30 or via this transportation robot 30 and another transportation robot 30, by the wireless communication of the mutual wireless communication units 240, the changed individual route information R to the transportation robot 30 to be controlled. In the processing for acquiring the maintenance information, the central control unit 230 causes the central wireless communication unit 200 to transmit the maintenance information of the transportation robot 30 to be controlled via the communication unit 331 of the transportation robot 30 closest to the transportation robot 30 to be controlled in the communication range of the central wireless communication unit 200 or via this transportation robot 30 and another transportation robot 30 by the wireless communication of the mutual wireless communication units 240.

The control unit in the embodiment or example described above includes one or more processors. The processor is a CPU (Central Processing Unit), a GPU (Graphics Processing Unit) or the like.

The storage unit in the embodiment or example described above includes, for example, a memory device such as a RAM (Random Access Memory) or a ROM (Read Only Memory), a nonvolatile storage device (such as a HDD (Hard Disk Drive) or an SSD (Solid State Drive)) or the like. In the storage unit, various types of information are stored. In the storage unit, programs for providing instructions to the processor to execute various types of processing in collaboration with an OS (Operating System) are also recorded.

The present specification discloses several embodiments on the subject of the present disclosure, includes the manufacturing and the use of any device or system by a person skilled in the art and the performance of any incorporated method and uses examples to be able to practice the embodiments on the subject of the present disclosure. The patentable scope of the subject of the present disclosure is defined by the scope of claims and can include other examples generated for the person skilled in the art. The other examples described above are intended to be in the scope of the claims when they include constituent elements which are not different from those in the scope of claims or when they include equivalent constituent elements which are not substantially different from those in the scope of claims.

For example, all or part of processing functions included in the transportation robot control system 3 and the warehouse system 1, in particular, processing functions performed in the control units 32 and 511 may be realized by a processor and programs for instructing (processor instruction) the processor to perform interpretation and execution. The programs may be stored in a server which is connected via any network to the transportation robot control system 3 and the warehouse system 1, and all or part thereof can be downloaded as necessary.

Programs for executing processing such as the processing for controlling the basic movements of the transportation robots 30 and the collision avoidance processing described in the present embodiment may be stored in any appropriate computer-readable recording medium (computer-readable medium). Any appropriate computer-readable recording medium for programs on a processor includes a non-transitory computer-readable storage medium (non-transitory computer-readable medium).

A program refers to a data processing method which is described in any language or by a description method, and the form thereof such as a source code or a binary code is not limited. The program is not necessarily limited to a single configuration, and includes a dispersion configuration serving as a plurality of modules or libraries and a configuration for achieving its function in collaboration with a separate program such as an OS.

SIGNS OF REFERENCE NUMERALS (FOR REFERENCE)

1 . . . WAREHOUSE SYSTEM
2 . . . RACK MODULE
3 . . . TRANSPORTATION ROBOT CONTROL SYSTEM FOR WAREHOUSE SYSTEM
10 . . . RACK
11 . . . FLOOR
12 . . . SUPPORT COLUMN
13 . . . SECTION
14 . . . STORAGE AREA
15 . . . MOVEMENT PASSAGE
16 . . . TRANSPORTATION ELEVATOR
16a . . . SPROCKET
16b . . . SHAFT
16c . . . ELECTRIC MOTOR
17 . . . LINE
20 . . . STORAGE BIN
21 . . . BIN MAIN BODY
21a . . . SIDEWALL
21b . . . OPENING PART
21c . . . BOTTOM SURFACE
22 . . . SUPPORT LEG
23 . . . ITEM
30 . . . TRANSPORTATION ROBOT
31 . . . HOUSING
32 . . . CONTROL UNIT
33 . . . MECHANISM UNIT
34 . . . STORAGE UNIT
321 . . . COMMUNICATION CONTROL UNIT
322 . . . RUNNING CONTROL UNIT
323 . . . RAISING/LOWERING CONTROL UNIT
331 . . . COMMUNICATION UNIT
332 . . . DRIVING WHEEL
333 . . . DRIVING MOTOR
334 . . . RAISING/LOWERING MECHANISM
335 . . . SENSOR
336 . . . BATTERY
40 . . . PICKING STATION
41A, 41B, 41C, 41D . . . PICKING POSITION
42 . . . SHIPMENT BIN
43A, 43B, 43C, 43D . . . LOADING POSITION
50 . . . MANAGEMENT SERVER
51 . . . CONTROL UNIT
52 . . . STORAGE UNIT
511 . . . COMMUNICATION CONTROL UNIT
512 . . . STOCK MANAGEMENT UNIT
513 . . . DEVICE CONTROL UNIT
521 . . . PROGRAM
522 . . . RACK INFORMATION
523 . . . ITEM INFORMATION
524 . . . BIN INFORMATION
525 . . . DEVICE INFORMATION
60 . . . OPERATOR
100 . . . BUILDING
101 . . . FLOOR SURFACE
102 . . . WALL SURFACE
200 . . . CENTRAL WIRELESS COMMUNICATION UNIT
210 . . . INDIVIDUAL WIRELESS COMMUNICATION UNIT
211 . . . INFORMATION READING UNIT
212 . . . INFORMATION HOLDING UNIT
220 . . . INDIVIDUAL CONTROL UNIT
230 . . . CENTRAL CONTROL UNIT
240 . . . MUTUAL WIRELESS COMMUNICATION UNIT

The invention claimed is:

1. A transportation robot control system for a warehouse system that stores items in a rack and includes a plurality of transportation robots for transporting the items stored, the transportation robot control system comprising:
a central wireless communication unit configured to be able to wirelessly communicate with the transportation robots in a specific region of the warehouse system;

an individual wireless communication unit configured to be able to wirelessly communicate with the transportation robots; and individual control units respectively controlling movements of the transportation robots, wherein the individual wireless communication unit includes information reading units that are respectively provided in the transportation robots and a plurality of information holding units that are arranged in the rack, each of the information holding units holds position information indicating a position in the rack, at the position the information holding unit being arranged and each of the information reading units is configured to be able to read position information held by the information holding units.

2. The transportation robot control system for a warehouse system according to claim 1, wherein each of the information reading units is configured to be able to read, in a predetermined range around each of the information holding units, the information held by the information holding unit, and the predetermined ranges of the information holding units do not overlap each other.

3. The transportation robot control system for a warehouse system according to claim 1, wherein the information holding units are uniformly distributed on each floor in the rack.

4. The transportation robot control system for a warehouse system according to claim 1, wherein each of the individual control units controls, based on the position information read from the information holding unit by the information reading unit of the transportation robot, the transportation robot being the object of the control by the individual control unit, the movement of the transportation robot being the object.

5. The transportation robot control system for a warehouse system according to claim 4, the transportation robot control system further comprising:

a central control unit which is a control unit for controlling the movements of the transportation robots, wherein the central control unit generates individual route information indicating a movement route of each of the transportation robots, the central wireless communication unit transmits the individual route information to the transportation robot for which the individual route information is generated and the individual control unit for the transportation robot controls, based on the position information read from the information reading unit, the transportation robot such that the transportation robot moves along the movement route indicated by the route information.

6. The transportation robot control system for a warehouse system according to claim 5, the transportation robot control system further comprising:

mutual wireless communication units allowing each of the transportation robots to wirelessly communicate with the other transportation robots, wherein each of the individual control units controls, based on content of wireless communication performed by the mutual wireless communication unit of the transportation robot being the object of the individual control unit, the movement of the corresponding transportation robot.

7. The transportation robot control system for a warehouse system according to claim 6, wherein each of the individual control units determines, based on the movement route information for the transportation robot being the object of the individual control unit, the position information read from the information holding unit for the transportation robot being the object and the content of the wireless communication performed by the mutual wireless communication unit, a collision between the corresponding transportation robot and another of the transportation robots.

8. The transportation robot control system for a warehouse system according to claim 7, wherein when each of the individual control units determines that the transportation robot being the object collides with the another of the transportation robots, the individual control unit stops the transportation robot being the object.

9. The transportation robot control system for a warehouse system according to claim 6, wherein the mutual wireless communication unit of one of the transportation robots exchanges, with the mutual wireless communication units of another of the transportation robots, by wireless communication, the position information and the route information thereof.

10. The transportation robot control system for a warehouse system according to claim 6, wherein the individual control unit of each of the transportation robot is configured to perform collision avoidance with another robot based on priority determination.

11. A method for controlling a transportation robot in a warehouse system that stores items in a rack and includes a plurality of transportation robots for transporting the items stored, the method comprising:

a central wireless communication step of wirelessly communicating with the transportation robots in a specific region of the warehouse system;

an individual wireless communication step of wirelessly communicating with the transportation robots; and individual control steps of respectively controlling movements of the transportation robots, wherein the individual wireless communication step includes information reading steps that are respectively performed in the transportation robots and a plurality of information holding steps that are respectively performed in a plurality of positions in the rack, each of the information holding steps is to hold position information indicating a position of the information holding step in the rack and each of the information reading steps is to read position information held by the information holding steps.

12. The method for controlling a transportation robot in a warehouse system according to claim 11, wherein each of the information reading steps is configured to be able to read, in a predetermined range around the position indicated by the position information held in the information holding step, the information held in the information holding step, and the predetermined ranges do not overlap each other.

13. The method for controlling a transportation robot in a warehouse system according to claim 11,
wherein the positions indicated by the position information held in the information holding steps are uniformly distributed on each floor in the rack.

14. The method for controlling a transportation robot in a warehouse system according to claim 11,
wherein each of the individual control steps controls, based on the position information which is read in the information reading step performed in the transportation robot, the transportation robot being the object of the control by the individual control step and is held in the information holding step, the movement of the transportation robot being the object.

15. The method for controlling a transportation robot in a warehouse system according to claim 14, the method further comprising:
a central control step of controlling the movements of the transportation robots,
wherein the central control step generates individual route information indicating a movement route of each of the transportation robots,
the central wireless communication step transmits the individual route information to the transportation robot for which the individual route information is generated and
the individual control step for the transportation robot controls, based on the position information read in the information reading step, the transportation robot such that the transportation robot moves along the movement route indicated by the route information.

16. The method for controlling a transportation robot in a warehouse system according to claim 15, the method further comprising:
mutual wireless communication steps of performing wireless communication between each of the transportation robots and the other transportation robots,
wherein each of the individual control steps controls, based on content of the mutual wireless communication step of the transportation robot being the object of the individual control step, the movement of the corresponding transportation robot.

17. The method for controlling a transportation robot in a warehouse system according to claim 16,
wherein each of the individual control steps determines, based on the movement route information for the transportation robot being the object of the individual control step, the position information read in the information holding step for the transportation robot being the object and the content of the mutual wireless communication step, a collision between the corresponding transportation robot and another of the transportation robots.

18. The method for controlling a transportation robot in a warehouse system according to claim 17,
wherein when each of the individual control steps determines that the transportation robot being the object collides with the another of the transportation robots, the individual control step stops the transportation robot being the object.

19. A transportation robot control system in a warehouse system according to claim 16,
wherein the mutual wireless communication step of one of the transportation robots exchanges, with the mutual wireless communication steps of another of the transportation robots, by wireless communication, the position information and the route information thereof.

20. A non-transitory computer-readable medium including a processor instruction,
wherein when the processor instruction is executed by one or more processors, the one or more processors are caused to perform, in a warehouse system that stores items in a rack and includes a plurality of transportation robots for transporting the items stored,
a central wireless communication step of wirelessly communicating with the transportation robots in a specific region of the warehouse system,
an individual wireless communication step of wirelessly communicating with the transportation robots and
individual control steps of respectively controlling movements of the transportation robots,
wherein the individual wireless communication step includes
information reading steps that are respectively performed in the transportation robots and
a plurality of information holding steps that are respectively performed in a plurality of positions in the rack,
each of the information holding steps is to hold position information indicating a position of the information holding step in the rack and
each of the information reading steps is to read position information held by the information holding steps.

* * * * *